United States Patent
Martin et al.

(10) Patent No.: US 8,670,171 B2
(45) Date of Patent: Mar. 11, 2014

(54) DISPLAY HAVING AN EMBEDDED MICROLENS ARRAY

(75) Inventors: Russel Allyn Martin, Menlo Park, CA (US); Koorosh Aflatooni, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 355 days.

(21) Appl. No.: 12/906,433

(22) Filed: Oct. 18, 2010

(65) Prior Publication Data

US 2012/0092747 A1    Apr. 19, 2012

(51) Int. Cl.
G02B 26/08    (2006.01)

(52) U.S. Cl.
USPC ........................................................ 359/224.1

(58) Field of Classification Search
USPC .................................. 359/223.1, 224.1, 224.2
See application file for complete search history.

(56) References Cited

U.S. PATENT DOCUMENTS

| | | |
|---|---|---|
| 2,518,647 A | 8/1950 | Teeple et al. |
| 2,534,846 A | 12/1950 | Jack et al. |
| 2,590,906 A | 4/1952 | Tripp |
| 2,677,714 A | 5/1954 | Max |
| 3,247,392 A | 4/1966 | Thelen |
| 3,439,973 A | 4/1969 | Paul |
| 3,443,854 A | 5/1969 | Weiss |
| 3,448,334 A | 6/1969 | Frost |
| 3,653,741 A | 4/1972 | Marks |
| 3,656,836 A | 4/1972 | De Cremoux et al. |
| 3,679,313 A | 7/1972 | Rosenberg |
| 3,725,868 A | 4/1973 | Malmer et al. |
| 3,728,030 A | 4/1973 | Hawes |
| 3,813,265 A | 5/1974 | Marks |
| 3,886,310 A | 5/1975 | Guldberg |
| 3,924,929 A | 12/1975 | Holmen et al. |
| 3,955,190 A | 5/1976 | Teraishi |
| 3,955,880 A | 5/1976 | Lierke |
| 3,990,784 A | 11/1976 | Gelber |
| 4,099,854 A | 7/1978 | Decker et al. |
| 4,116,718 A | 9/1978 | Yerkes |

(Continued)

FOREIGN PATENT DOCUMENTS

| | | |
|---|---|---|
| CA | 2 490 975 | 1/2004 |
| CN | 1517743 | 8/2004 |

(Continued)

OTHER PUBLICATIONS

Application as filed in U.S. Appl. No. 13/337,494, dated Dec. 27, 2011.

(Continued)

*Primary Examiner* — Joseph P Martinez
(74) *Attorney, Agent, or Firm* — Knobbe, Martens, Olson & Bear, LLP

(57) ABSTRACT

The present disclosure provides methods, systems, and apparatus for directing incident light toward central regions of interferometric modulator displays. In one aspect, a display includes an array of microlenses embedded in a substrate adjacent a first surface of the substrate. An array of light modulators can be disposed over the first surface of the substrate. A light modulator can be disposed over a corresponding microlens. The microlenses can converge or concentrate incident light onto central regions of the corresponding light modulators. The microlenses may include single-element lenses, compound lenses, and/or graded-index lenses. Various methods of manufacturing such displays are also disclosed.

45 Claims, 18 Drawing Sheets

(56) References Cited

U.S. PATENT DOCUMENTS

| | | |
|---|---|---|
| 4,149,902 A | 4/1979 | Mauer et al. |
| 4,974,942 A | 12/1990 | Gross |
| 5,037,173 A | 8/1991 | Sampsell et al. |
| 5,341,242 A | 8/1994 | Gilboa et al. |
| 5,398,125 A | 3/1995 | Willett |
| 5,448,659 A | 9/1995 | Tsutsui et al. |
| 5,544,268 A | 8/1996 | Bischel et al. |
| 5,633,739 A | 5/1997 | Matsuyama et al. |
| 5,647,036 A | 7/1997 | Deacon |
| 5,745,281 A | 4/1998 | Yi |
| 5,751,492 A | 5/1998 | Meyers |
| 5,754,260 A | 5/1998 | Ooi |
| 5,805,117 A | 9/1998 | Mazurek |
| 5,815,229 A | 9/1998 | Shapiro |
| 5,818,095 A | 10/1998 | Sampsell |
| 5,835,256 A | 11/1998 | Huibers |
| 5,914,804 A | 6/1999 | Goossen |
| 5,933,183 A | 8/1999 | Enomoto |
| 5,986,796 A | 11/1999 | Miles |
| 5,991,073 A | 11/1999 | Woodgate et al. |
| 6,040,937 A | 3/2000 | Miles |
| 6,055,090 A | 4/2000 | Miles |
| 6,072,620 A | 6/2000 | Shiono |
| 6,094,285 A | 7/2000 | Wickham et al. |
| 6,195,196 B1 | 2/2001 | Kimura et al. |
| 6,211,976 B1 | 4/2001 | Popovich |
| 6,282,010 B1 | 8/2001 | Sulzbach |
| 6,323,892 B1 | 11/2001 | Mihara |
| 6,356,378 B1 | 3/2002 | Huibers |
| 6,381,022 B1 | 4/2002 | Zavracky |
| 6,411,423 B2 | 6/2002 | Ham |
| 6,483,613 B1 | 11/2002 | Woodgate et al. |
| 6,493,475 B1 | 12/2002 | Lin |
| 6,520,643 B1 | 2/2003 | Holman et al. |
| 6,522,794 B1 | 2/2003 | Bischel |
| 6,574,033 B1 | 6/2003 | Chui |
| 6,603,520 B2 | 8/2003 | Umemoto |
| 6,624,944 B1 | 9/2003 | Wallace et al. |
| 6,631,998 B2 | 10/2003 | Egawa et al. |
| 6,636,322 B1 | 10/2003 | Terashita |
| 6,636,653 B2 | 10/2003 | Miracky et al. |
| 6,650,455 B2 | 11/2003 | Miles |
| 6,652,109 B2 | 11/2003 | Nakamura |
| 6,674,562 B1 | 1/2004 | Miles |
| 6,680,792 B2 | 1/2004 | Miles |
| 6,826,000 B2 | 11/2004 | Lee et al. |
| 6,841,787 B2 | 1/2005 | Almogy |
| 6,930,816 B2 | 8/2005 | Mochizuki |
| 6,967,779 B2 | 11/2005 | Fadel et al. |
| 6,970,031 B1 | 11/2005 | Martin |
| 7,002,726 B2 | 2/2006 | Patel |
| 7,009,754 B2 | 3/2006 | Huibers |
| 7,030,949 B2 | 4/2006 | Kashima |
| 7,042,643 B2 | 5/2006 | Miles |
| 7,068,948 B2 | 6/2006 | Wei et al. |
| 7,072,093 B2 | 7/2006 | Piehl et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,138,984 B1 | 11/2006 | Miles |
| 7,142,347 B2 | 11/2006 | Islam |
| 7,161,728 B2 | 1/2007 | Sampsell |
| 7,161,730 B2 | 1/2007 | Floyd |
| 7,218,429 B2 | 5/2007 | Batchko |
| 7,321,349 B2 | 1/2008 | Fukuda et al. |
| 7,324,248 B2 | 1/2008 | Brotherton-Ratcliffe et al. |
| 7,327,510 B2 | 2/2008 | Cummings et al. |
| 7,342,705 B2 | 3/2008 | Chui et al. |
| 7,342,709 B2 | 3/2008 | Lin |
| 7,369,294 B2 | 5/2008 | Gally |
| 7,372,631 B2 | 5/2008 | Ozawa |
| 7,376,308 B2 | 5/2008 | Cheben et al. |
| 7,400,439 B2 | 7/2008 | Holman |
| 7,417,735 B2 | 8/2008 | Cummings |
| 7,498,621 B2 | 3/2009 | Seitz |
| 7,508,571 B2 | 3/2009 | Gally |
| 7,561,323 B2 | 7/2009 | Gally |
| 7,564,612 B2 | 7/2009 | Chui |
| 7,605,969 B2 | 10/2009 | Miles |
| 7,630,123 B2 | 12/2009 | Kothari |
| 7,710,636 B2 | 5/2010 | Chui |
| 7,807,488 B2 | 10/2010 | Gally et al. |
| 7,813,026 B2 | 10/2010 | Sampsell |
| 7,848,001 B2 | 12/2010 | Miles |
| 7,907,319 B2 | 3/2011 | Miles |
| 8,045,252 B2 | 10/2011 | Chui et al. |
| 8,111,445 B2 | 2/2012 | Chui et al. |
| 8,344,377 B2 | 1/2013 | Gally |
| 2001/0003487 A1 | 6/2001 | Miles |
| 2001/0010952 A1 | 8/2001 | Abramovich |
| 2001/0019240 A1 | 9/2001 | Takahashi |
| 2001/0049061 A1 | 12/2001 | Nakagaki |
| 2002/0075555 A1 | 6/2002 | Miles |
| 2002/0080465 A1 | 6/2002 | Han |
| 2002/0105699 A1 | 8/2002 | Miracky |
| 2002/0126364 A1 | 9/2002 | Miles |
| 2003/0107692 A1 | 6/2003 | Sekiguchi |
| 2003/0136759 A1 | 7/2003 | Mikolas |
| 2003/0151821 A1 | 8/2003 | Favalora |
| 2003/0161040 A1 | 8/2003 | Ishii |
| 2003/0210363 A1 | 11/2003 | Yasukawa |
| 2004/0001169 A1 | 1/2004 | Saiki |
| 2004/0115339 A1 | 6/2004 | Ito |
| 2004/0125048 A1 | 7/2004 | Fukuda |
| 2004/0188599 A1 | 9/2004 | Viktorovitch |
| 2004/0233503 A1* | 11/2004 | Kimura ................ 359/275 |
| 2004/0239851 A1 | 12/2004 | Tsukagoshi et al. |
| 2005/0224694 A1 | 10/2005 | Yaung |
| 2005/0225824 A1* | 10/2005 | Bell et al. ................ 359/237 |
| 2006/0066935 A1 | 3/2006 | Cummings |
| 2006/0067600 A1 | 3/2006 | Gally et al. |
| 2006/0073623 A1 | 4/2006 | Conley, Jr. et al. |
| 2006/0077514 A1 | 4/2006 | Sampsell |
| 2006/0274400 A1 | 12/2006 | Miles |
| 2007/0046863 A1 | 3/2007 | Miyao et al. |
| 2007/0132843 A1 | 6/2007 | Miles |
| 2007/0297710 A1 | 12/2007 | Suzuki |
| 2008/0112039 A1 | 5/2008 | Chui |
| 2008/0151347 A1 | 6/2008 | Chui |
| 2009/0086301 A1 | 4/2009 | Gally |
| 2009/0126777 A1 | 5/2009 | Khazeni et al. |
| 2009/0225435 A1 | 9/2009 | Boettiger et al. |
| 2009/0320899 A1 | 12/2009 | Schiavoni et al. |
| 2010/0165443 A1 | 7/2010 | Chui |
| 2010/0172012 A1 | 7/2010 | Sampsell |
| 2010/0188367 A1 | 7/2010 | Nagafuji et al. |
| 2010/0214642 A1 | 8/2010 | Miles |
| 2010/0278480 A1 | 11/2010 | Vasylyev |
| 2012/0099177 A1 | 4/2012 | Chui et al. |

FOREIGN PATENT DOCUMENTS

| | | |
|---|---|---|
| DE | 196 22 748 | 12/1997 |
| DE | 102 28 946 | 1/2004 |
| EP | 0 278 038 | 8/1988 |
| EP | 0 534 426 A2 | 3/1993 |
| EP | 0 822 441 | 2/1998 |
| EP | 0 855 745 | 7/1998 |
| EP | 1 014 161 | 6/2000 |
| EP | 1 020 765 | 7/2000 |
| EP | 1 089 115 | 4/2001 |
| EP | 1 341 025 | 9/2003 |
| EP | 2 487 520 | 8/2012 |
| GB | 2278222 | 11/1994 |
| JP | 62-009317 | 1/1987 |
| JP | 04-081816 | 3/1992 |
| JP | 08 018990 | 1/1996 |
| JP | 09 189869 | 7/1997 |
| JP | 10 202948 | 8/1998 |
| JP | 11 002712 | 1/1999 |
| JP | 11 174234 | 7/1999 |
| JP | 11 211999 | 8/1999 |
| JP | 11-258558 | 9/1999 |

(56) References Cited

FOREIGN PATENT DOCUMENTS

| | | |
|---|---|---|
| JP | 2000 500245 | 1/2000 |
| JP | 2000 514568 | 10/2000 |
| JP | 2001 343514 | 12/2001 |
| JP | 2002 72284 | 3/2002 |
| JP | 2002-174780 | 6/2002 |
| JP | 2002 287047 | 10/2002 |
| JP | 2003 177336 | 6/2003 |
| JP | 2003-248181 | 9/2003 |
| JP | 2004-111278 | 4/2004 |
| JP | 2004-206049 | 7/2004 |
| JP | 2009 0300966 | 12/2009 |
| KR | 2002 010322 | 2/2002 |
| TW | 556009 | 10/2003 |
| TW | 200410191 | 6/2004 |
| WO | WO 97/16756 | 5/1997 |
| WO | WO 97/17628 | 5/1997 |
| WO | WO 97/46908 | 12/1997 |
| WO | WO 99/67680 | 12/1999 |
| WO | WO 00/50807 | 8/2000 |
| WO | WO 01/81994 | 11/2001 |
| WO | WO 03/056876 | 7/2003 |
| WO | WO 2004/006003 | 1/2004 |
| WO | WO 2005/076051 | 8/2005 |
| WO | WO 2005/098511 A2 | 10/2005 |
| WO | WO 2006/036564 | 4/2006 |
| WO | WO 2009/158354 A1 | 12/2009 |
| WO | WO 2012/054303 | 4/2012 |

OTHER PUBLICATIONS

Goosen, "MEMS-Based Variable Optical Interference Devices", IEEE/LEOS International Conference on Optical MEMS, pp. 17-18, Aug. 2000.

Huang et al., "Multidirectional Aymmetrical Microlens-Array Light Control Films for High Performance Reflective Liquid Crystal Displays," SID Digest, 2002, pp. 870-873.

Miles, M., et. al., "Digital Paper™ for reflective displays," Journal of the Society for Information Display, Society for Information Display, San Jose, US, vol. 11, No. 1, pp. 209-215, 2003.

Obi et. al., Fabrication of Optical MEMS in SOL-GEL Materials; IEEE/LEOS International Conference on Optical MEMS, pp. 39-40, Aug. 2002.

International Search Report and Written Opinion for International Patent Application No. PCT/US2011/056188, Dec. 23, 2011, 12 pages.

International Preliminary Report on Patentability in PCT Application No. PCT/US2011/056188 dated Feb. 13, 2013.

\* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

DISPLAY HAVING AN EMBEDDED MICROLENS ARRAY

TECHNICAL FIELD

This disclosure relates to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a metallic membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of manufacturing a display element. The method includes forming a microlens in a substrate having a first surface and a second surface. The first surface is spaced from the second surface, and the microlens is disposed adjacent the first surface of the substrate. The method further includes forming a light modulator over the first surface of the substrate, with the light modulator disposed over the microlens. The light modulator can include an optical cavity configured to be adjusted to interferometrically modulate light.

Forming the microlens can include forming a cavity in the first surface of the substrate, and forming a first dielectric layer over the first surface. The first dielectric layer can include a refractive index that is different from a refractive index of the substrate, and the first dielectric layer can at least partially fill the cavity in the first surface of the substrate. Forming the microlens can further include forming a second dielectric layer over the first dielectric layer, with the second dielectric layer including a refractive index that is different from the refractive index of the first dielectric layer. Forming the microlens can include masking at least a portion of the first surface of the substrate with a mask including at least one opening, and diffusing a dopant into the substrate. The dopant can be selected to change a refractive index of the substrate.

Forming the light modulator can include forming a partial reflector over the first surface of the substrate, and forming a movable reflector over the partial reflector. The movable reflector can be spaced from the partial reflector to provide the optical cavity, and the movable reflector can be configured to move with respect to the partial reflector to interferometrically modulate light in the optical cavity.

A display can include a plurality of display elements, where one, some, or all of the display elements can be formed according to implementations of this method.

Another innovative aspect of the subject matter described in this disclosure can be implemented in an electromechanical systems device. The device can include a substrate having a first side and a second side. The substrate can have a substrate refractive index. The device can also include a microlens disposed in the substrate. The microlens can be disposed adjacent the first side of the substrate. The microlens can include a first lens having a first refractive index and a second lens having a second refractive index. The second refractive index may be different from the first refractive index. At least one of the first refractive index and the second refractive index may be different from the substrate refractive index. The device can also include a light modulator disposed over the first side of the substrate. The light modulator can be substantially aligned with the microlens. The light modulator can include an optical cavity configured to be adjusted to interferometrically modulate light.

Another innovative aspect of the subject matter described in this disclosure can be implemented in an electromechanical systems device. The device can include means for refracting light. The refracting means can be disposed in a substrate having a first side and a second side and a substrate refractive index. The refracting means can be disposed adjacent the first side of the substrate. The refracting means can include a first means for refracting light having a first refractive index and a second means for refracting light having a second refractive index. The second refractive index may be different from the first refractive index, and at least one of the first refractive index and the second refractive index may be different from the substrate refractive index. The device also can include means for modulating light disposed over first side of the substrate. The light modulating means can be substantially aligned with the refracting means. The light modulating means can include an optical cavity configured to be adjusted to interferometrically modulate light.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
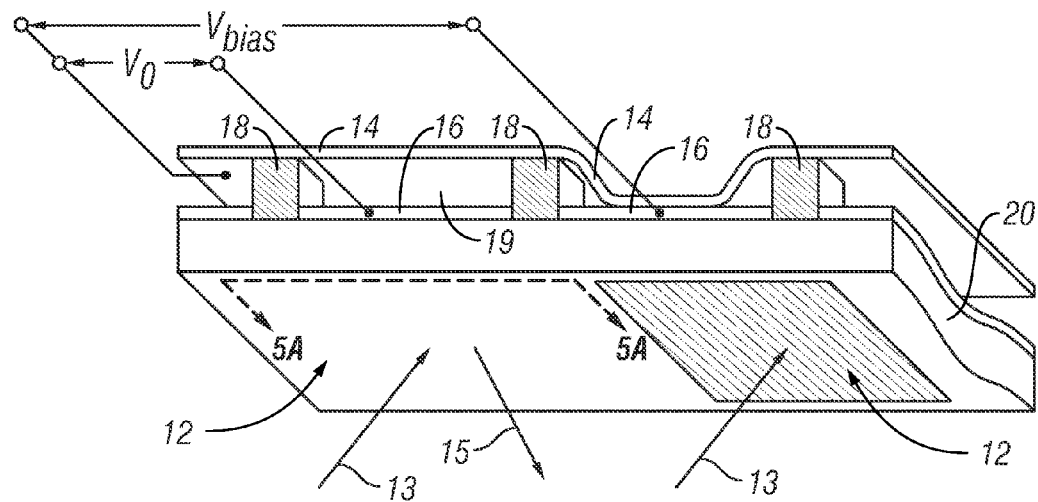
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

In certain implementations of light modulators, the reflectivity and/or color saturation produced by the modulator may be improved if incident light is directed toward the central region of the light modulator and away from edges of the light modulator. Electrical connections that provide power to the light modulators take up design space on display devices, and light incident on the connections typically does not contribute to an image produced by the device. Directing incident light toward the central regions of the modulators may permit light, which would otherwise be incident on the electrical connections, to be modulated by the modulators and contribute to the image, which can improve the brightness of the device. Accordingly, certain implementations of display devices described herein include a plurality of display elements that each include a light modulator and a microlens to concentrate, converge, and/or focus incident light toward the central region of the light modulator. The microlens can be embedded in a substantially transparent substrate (e.g., glass) adjacent a surface of the substrate over which the light modulators are disposed. In some such implementations, the microlenses are relatively close to the light modulators and can concentrate light from a relatively wide range of angles (e.g., as compared to microlenses disposed on an opposite surface of the substrate away from the light modulators). The microlenses may be single-element lenses, compound lenses (including two or more elements), or graded-index (or gradient-index) lenses.

Particular implementations of the subject matter described in this disclosure can be implemented to realize one or more of the following potential advantages. Display devices including display elements having microlenses may provide improved reflectivity, color saturation, brightness, and/or contrast. For example, the microlens may converge or concentrate incident light toward the central region of a reflective layer of the display element (and away from edges of the reflective layer), so that variations in the reflectivity and/or the amount of color desaturation may be reduced. Also, by converging or concentrating the incident light toward the central region of the reflective layer, some light that would otherwise be incident on a black mask (if used) will be reflected by the display element and will thereby contribute to the image produced by the display device.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
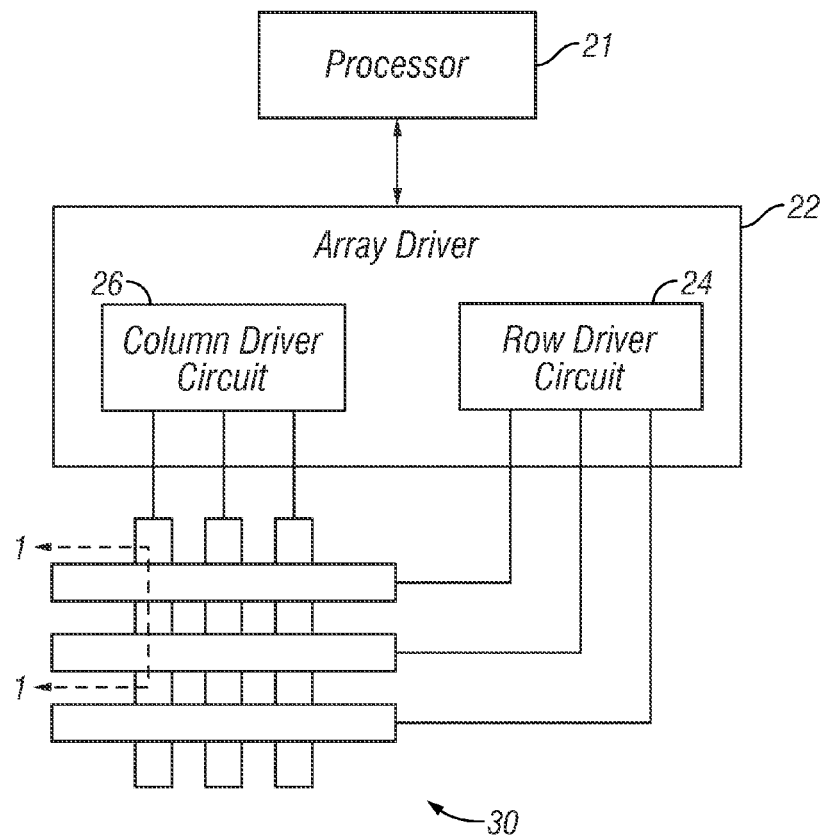
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3A, 3B:
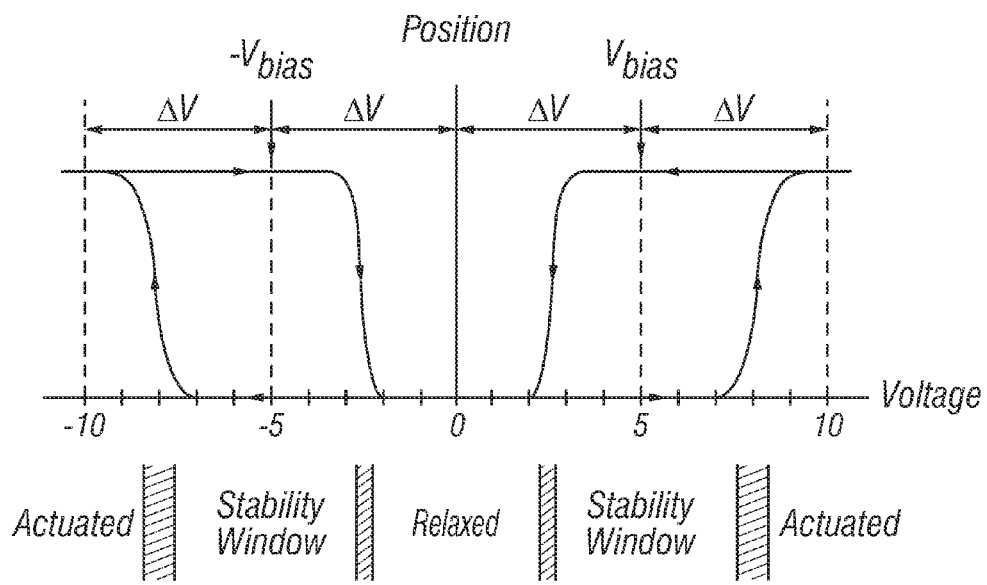
FIG. 3A shows an example of a diagram illustrating movable reflective layer position versus applied voltage for the interferometric modulator of FIG. 1.
FIG. 3B shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 4A:
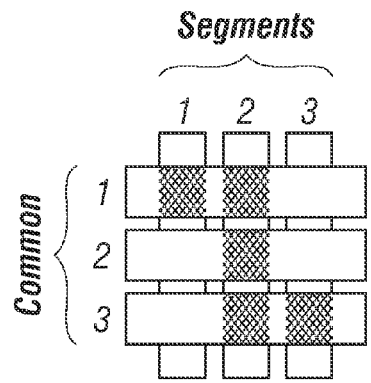
FIG. 4A shows an example of a diagram illustrating a frame of display data in the 3×3 interferometric modulator display of FIG. 2.
Figure 4B:
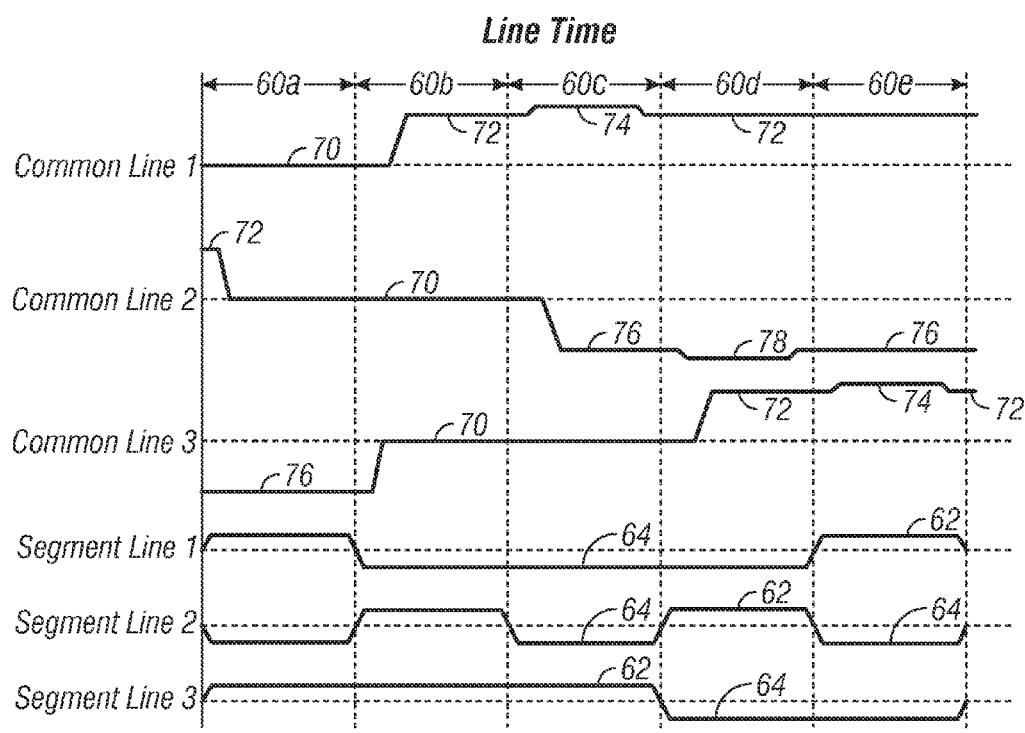
FIG. 4B shows an example of a timing diagram for common and segment signals that may be used to write the frame of display data illustrated in FIG. 4A.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position.

Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
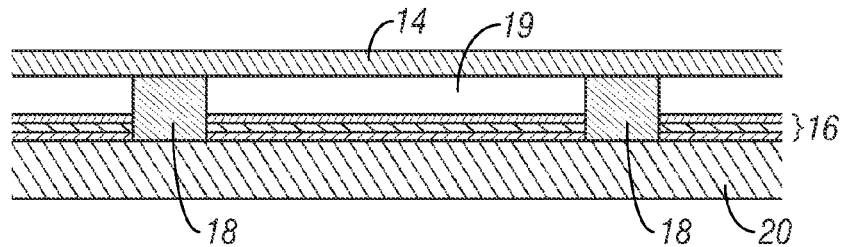
FIG. 5A shows an example of a partial cross-section of the interferometric modulator display of FIG. 1.
Figure 5B:
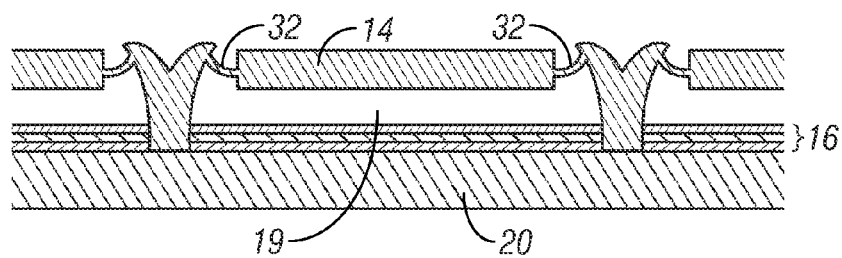
FIGS. 5B-5E show examples of cross-sections of varying implementations of interferometric modulators.
Figure 5C:
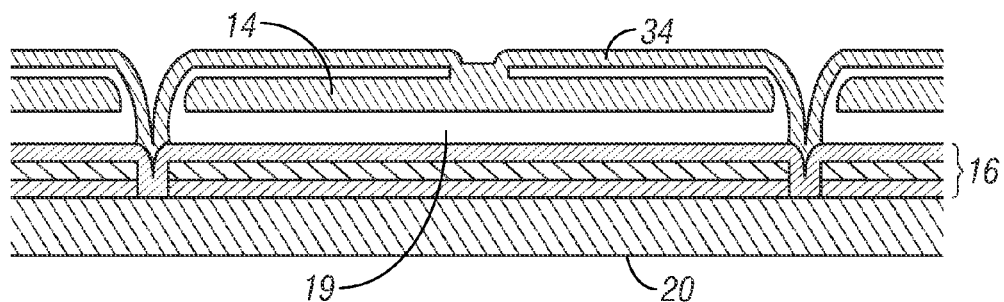

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 5D:
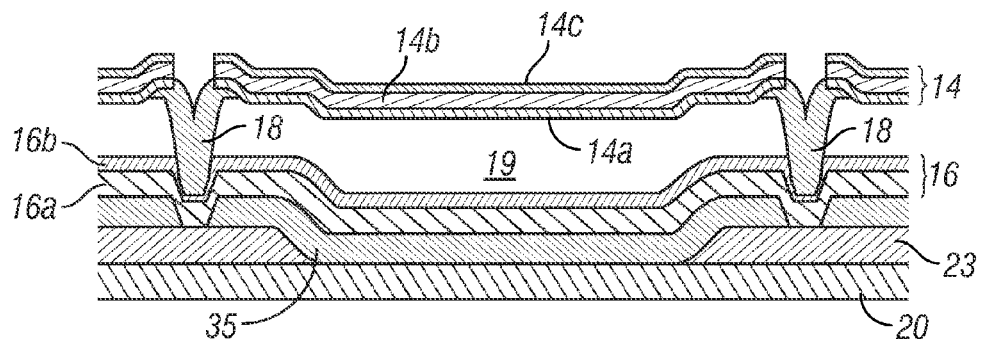

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, $CF_4$ and/or $O_2$ for the MoCr and $SiO_2$ layers and $Cl_2$ and/or $BCl_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 5E:
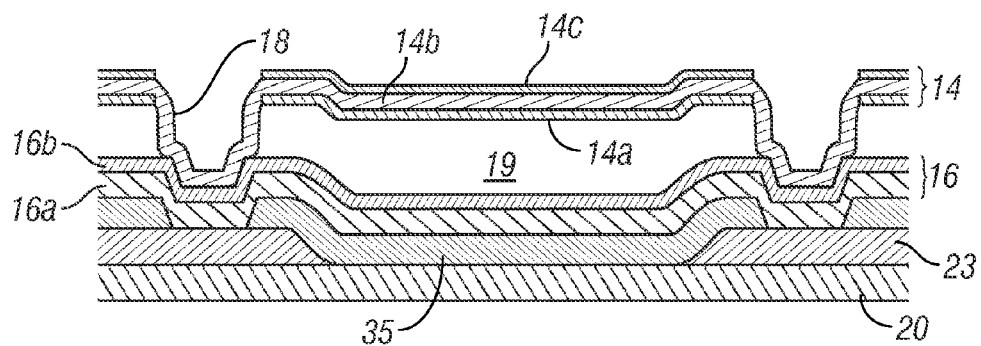

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as (e.g., patterning).

Figure 6:
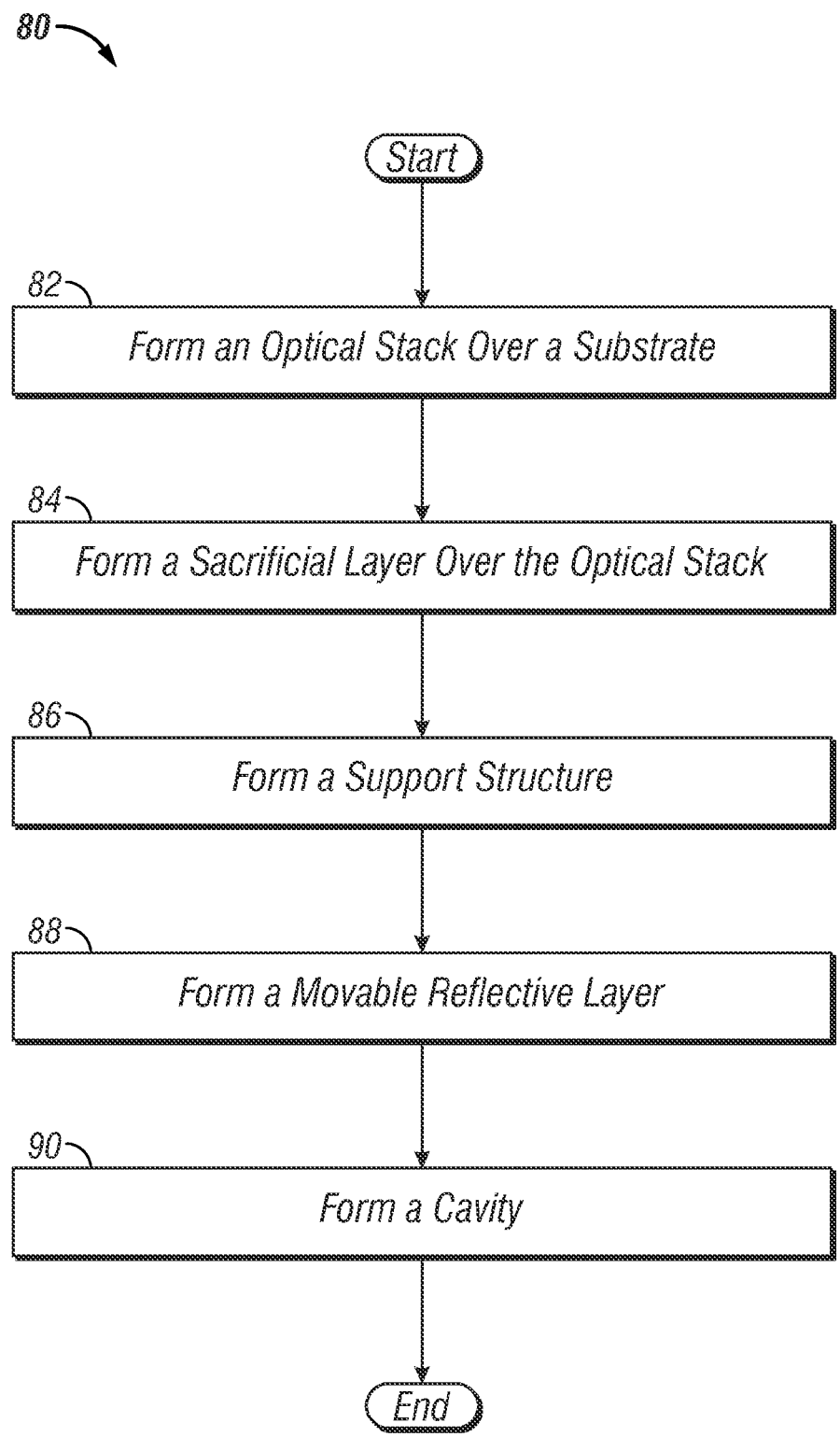
FIG. 6 shows an example of a flow diagram illustrating a manufacturing process for an interferometric modulator.
Figure 7A:
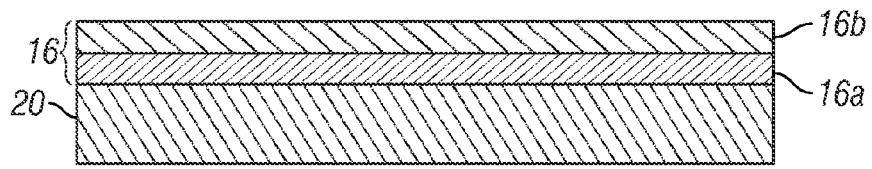
FIGS. 7A-7E show examples of cross-sectional schematic illustrations of various stages in a method of making an interferometric modulator.

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16*a* and 16*b*, although more or fewer sub-layers may be included in some other implementations. In some implementations, one of the sub-layers 16*a*, 16*b* can be configured with both optically absorptive and conductive properties, such as the combined conductor/absorber sub-layer 16*a*. Additionally, one or more of the sub-layers 16*a*, 16*b* can be patterned into parallel strips, and may form row electrodes in a display device. Such patterning can be performed by a masking and etching process or another suitable process known in the art. In some implementations, one of the sub-layers 16*a*, 16*b* can be an insulating or dielectric layer, such as sub-layer 16*b* that is deposited over one or more metal layers (e.g., one or more reflective and/or conductive layers). In addition, the optical stack 16 can be patterned into individual and parallel strips that form the rows of the display.

Figure 7B:
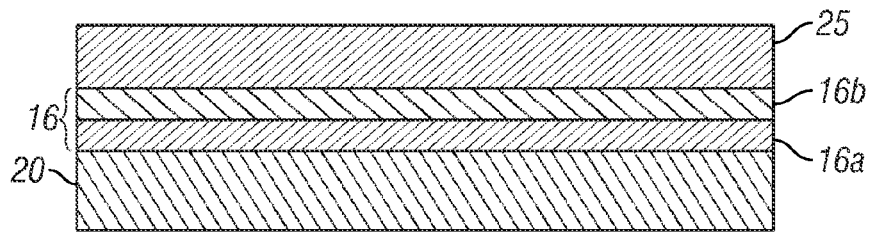

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride (XeF$_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 7C:
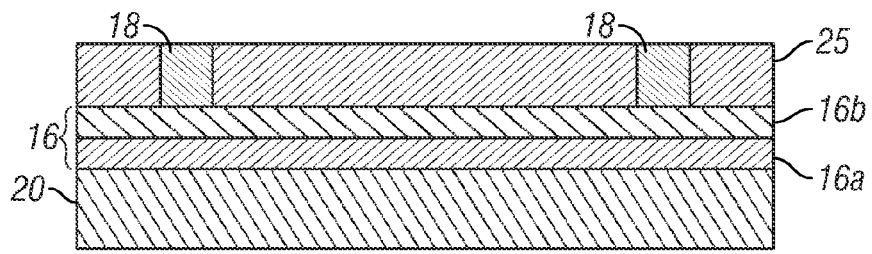

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 7D:
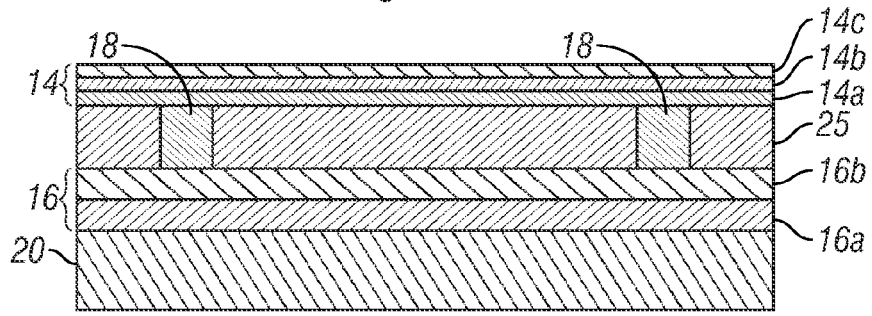
Figure 7E:
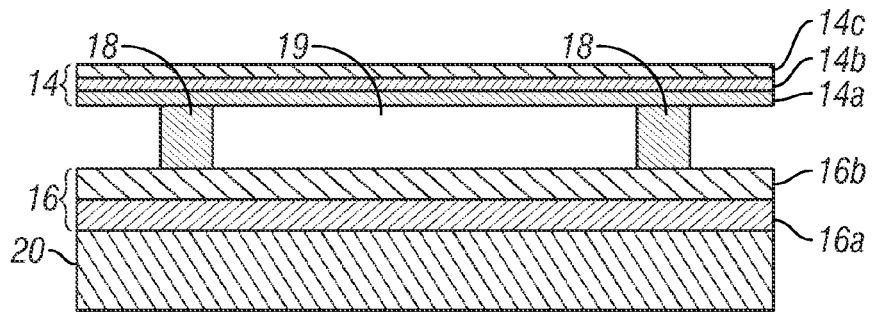

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14*a*, 14*b*, 14*c* as shown in FIG. 7D. In some implementations, one or more of the sub-layers, such as sub-layers 14*a*, 14*c*, may include highly reflective sub-layers selected for their optical properties, and another sub-layer 14*b* may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid XeF$_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In some implementations, a display that includes interferometric modulators can have certain imperfections that can lead to a reduction in the quality of the image produced by the display. For example, the reflectivity of the reflective layer 14 of an interferometric modulator may be non-uniform across the reflective layer 14, which can lead to non-uniformity of the light reflected from the modulator. The reflective layer 14 may be non-flat, e.g., slightly curved, which can lead to a variation in the color of light reflected by the modulator. Such color variation tends to de-saturate the color produced by the modulator. Also, electrical connections that provide voltage to the modulators take up space on the display and thereby reduce the area that is usable to reflect light for an image. In some implementations, the electrical connections are hidden by a black mask to preserve contrast ratio of the display. Light incident on the black mask does not contribute to the reflected image produced by the display.

The implementations described herein are configured to reduce or avoid some or all of these imperfections. For example, in some implementations, the central region of the reflective layer 14 tends to be flatter and have more uniform reflectivity (as a function of wavelength) as compared to the entire reflective layer 14. Therefore, converging or concentrating incident light toward the central region of the reflective layer 14 (and away from edges of the reflective layer) may reduce the variation in reflectivity and the amount of color desaturation of the modulator. Also, by converging or concentrating the incident light toward the central region of the modulator, some light that would otherwise be incident on the black mask will be reflected by the modulator and thereby contribute to the image produced by the display. To converge or concentrate light toward the center of the modulator, certain implementations disclosed herein use an array of microlenses embedded in the substrate adjacent the modulators. Incident light is refracted by the microlenses and converged, concentrated, and/or focused onto the central regions of the reflective layer.

Figure 8:
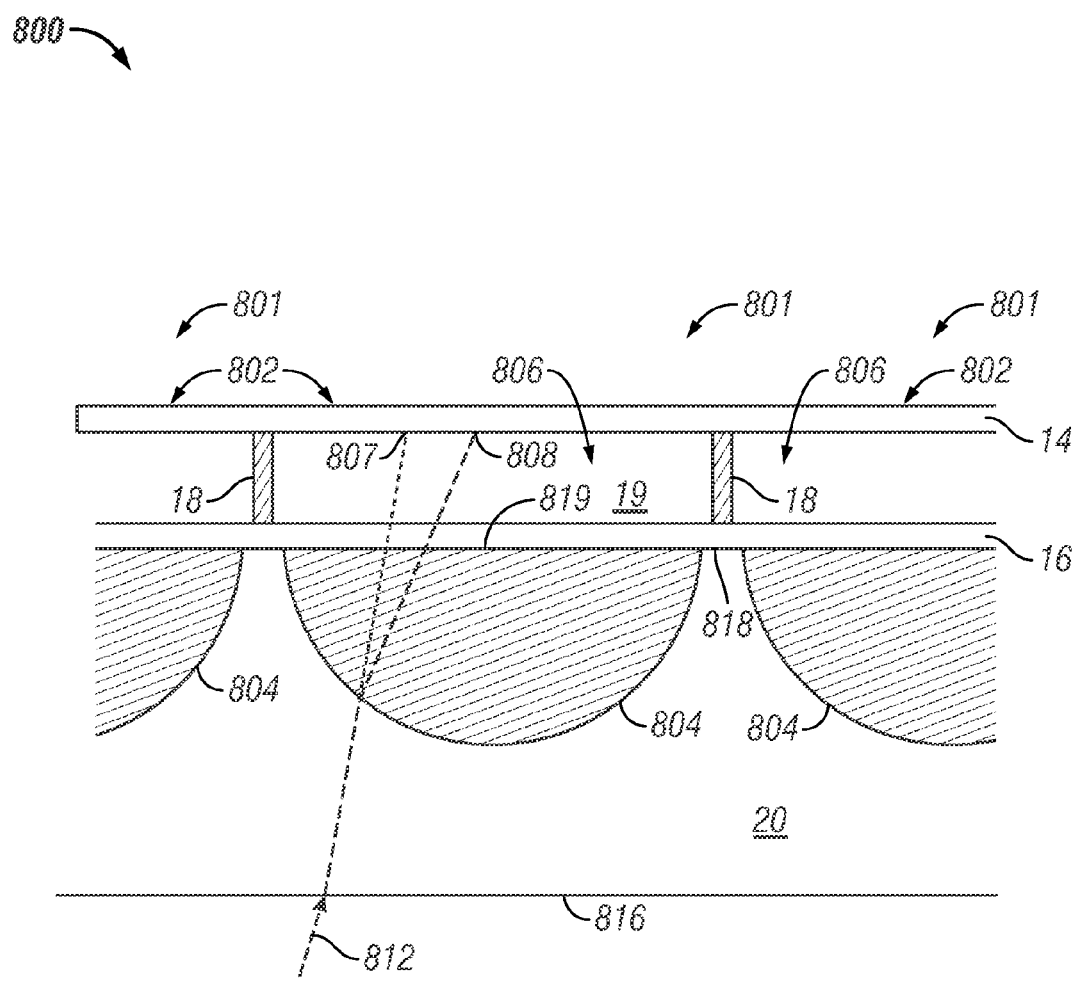
FIG. 8 shows an example of a cross section of a display including an array of microlenses embedded in a substrate.

FIG. 8 shows an example of a cross section of a display 800 that includes a plurality of display elements 801. The display elements 801 can be arranged in a one-dimensional or two-dimensional array, which may be periodic and/or non-periodic. In the illustrated implementation, each display element 801 includes a lens or microlens 804 and a light modulator 802. In various implementations, the light modulators 802 can include any of the light modulators described herein such as, for example, any of the interferometric modulators shown and described with reference to FIGS. 1 and 5A-5E.

In the implementation shown in FIG. 8, the light modulator 802 includes a partial reflector such as, e.g., within the optical stack 16, and a movable reflector such as, e.g., the movable reflective layer 14. The partial reflector is spaced apart, or positioned away, from the movable reflector (e.g., by posts 18) to provide an optical cavity 806. The movable reflector can be moved toward or away from the partial reflector (in response to a suitable electrical signal) to adjust the optical cavity 806 and the height of the gap 19, thereby adjusting the interferometric modulation of light in the optical cavity 806.

The light modulators 802 can be disposed over a first surface 818 of the substrate 20. For example, in the implementation shown in FIG. 8, the light modulators 802 are disposed on the first surface 818 (e.g., the optical stack 16 is disposed on the first surface 818). In other implementations, one or more layers (e.g., spacer layers, passivation layers, filter layers, diffuser layers, etc.) may be disposed between the first surface 818 of the substrate 20 and the light modulator 802. The substrate 20 has a second surface 816 that is spaced apart from the first surface 818 by the thickness of the substrate 20. In use, the display 800 is generally oriented so that the second surface 816 of the substrate 20 is proximal to the user and the first surface 818 of the substrate 20 is distal to the user. Light incident on the display 800 is reflected in various amounts as the light modulators 802 are actuated between the open and closed states.

In the implementation shown in FIG. 8, the microlenses 804 are disposed in (e.g., embedded in) the substrate 20 adjacent the first surface 818 actuated between the open and closed states. The microlenses 804 may be sized and shaped so that the microlenses 804 are spaced from the second surface 816 of the substrate 20. As schematically illustrated in FIG. 8, a portion of the microlens 804 (e.g., surface 819) may be substantially even with the first surface 818 of the substrate 20. In various embodiments, each of the microlenses 804 has a surface 819 that is disposed within approximately 100 μm of the first surface 818 such that the microlenses are either recessed within or protruding from the first surface 818. In other implementations, the surfaces 819 of the microlenses 804 are within approximately 50 μm of the first surface 818, within approximately 25 μm of the first surface 818, within approximately 15 μm of the first surface 818, within approximately 10 μm of the first surface 818, within approximately 5 μm of the first surface 818, or within some other suitable distance from the first surface 818. In some implementations, the microlenses 804 are disposed adjacent the first surface 818 by less than approximately the pitch of the light modulators 802.

The microlenses 804 can include one or more materials having a refractive index (or refractive indices) that are different from the refractive index of the substrate 20. The refractive index of the microlens can be larger than the refractive index of the substrate 20 so that the microlens 804 is a positive (or converging) lens. For example, the microlens 804 may include silicon nitride (SiN), which has a refractive index of about 2.05, and the substrate 20 may include glass (e.g., $SiO_2$), which has a refractive index of about 1.51. The microlens 804 may include (additionally or alternatively) silicon oxynitride (SiON), polyimide, indium tin oxide (ITO), amorphous silicon, titanium dioxide ($TiO_2$), aluminum oxide ($Al_2O_3$), or combinations thereof. As schematically illustrated in FIG. 8, the microlens 804 can be shaped substantially as a portion of a sphere (e.g., a hemisphere) to form a plano-convex lens. Other shapes also can be used such as, e.g., ellipsoids, ovoids, cylinders, prisms, polyhedra, etc. The size of the microlens 804 can be comparable to the pitch of the light modulators 802. For example, the diameter (or transverse size) of a microlens may be less than about or approximately equal to the pitch. The radius of curvature of the microlens 804 may be greater than about, approximately equal to, or less than about the size of the light modulator. For example, the radius of curvature of the microlenses 804 schematically illustrated in FIG. 8 is approximately one-half the size of the light modulator 802. In some implementations, the radius of curvature of the microlenses 804 is approximately one-half the pitch D of the light modulators (see, e.g., FIG. 9A). The radius of curvature of the microlenses can be selected to provide a suitable degree of convergence or concentration of light toward the center of the light modulator. In some implementations, the pitch of the microlenses 804 is substantially matched to the pitch D of the light modulators.

In some implementations, each light modulator 802 is substantially disposed over a corresponding microlens 804. For example, as schematically shown in FIG. 8, the center of each light modulator 802 is substantially aligned with the center of its corresponding microlens 804. In other implementations, a light modulator 802 can be disposed over two or more microlenses.

FIG. 8 schematically shows an example that is intended to illustrate, but not to limit, features of the embedded microlens 804. In FIG. 8, a light ray 812 is shown as incident on the display 800. If the microlens 804 were not used in the display 800, the light ray 812 would propagate along a path schematically illustrated by the dotted line and would intercept the reflective layer 14 at a position 807. The presence of the microlens 804 in the display 800 causes the light ray 812 to refract along a path schematically illustrated by the dashed line and to intercept the reflective layer 14 at position 808, which is closer to the center of the reflective layer than the position 807. Accordingly, this example schematically illustrates how the microlens 804 can converge or concentrate light toward the center of the reflective layer 14 (see also, FIGS. 11A and 11B). In some embodiments, the focal length of the microlens 804 can be selected to focus light onto the reflective layer 14 or to provide a focus in the optical cavity 806.

Implementations of the displays 800 in which the microlens array is disposed adjacent the first surface 818 of the substrate 20 may have advantages compared to displays 800 in which a microlens array is disposed adjacent the second surface 816 of the substrate (e.g., the surface proximal to the user). In some implementations, the substrate 20 thickness can be typically much larger than the pitch or spacing between adjacent display elements. For example, the pitch may be in a range from about 10 µm to 50 µm, and the substrate thickness may be in a range from about 200 µm to 1000 µm. Therefore, a microlens array disposed adjacent the first surface 818 of the substrate 20 will typically be much closer to the light modulators than a microlens array disposed adjacent the second surface 816 of the substrate 20. A microlens array disposed close to the light modulators 802 can be implemented to concentrate light toward the modulators from a wider range of angles than a microlens array disposed much farther from the modulators, which can concentrate light onto the modulators from only a narrow range of angles that are nearly normal to the substrate 20. Also, a microlens array disposed in the substrate 20, adjacent the first surface 818, will be less likely to be damaged by routine use of the display 800 than a microlens array disposed in or on the second surface 816 of the substrate, where it may be more prone to exposure and may be scratched or damaged.

Figure 9A:
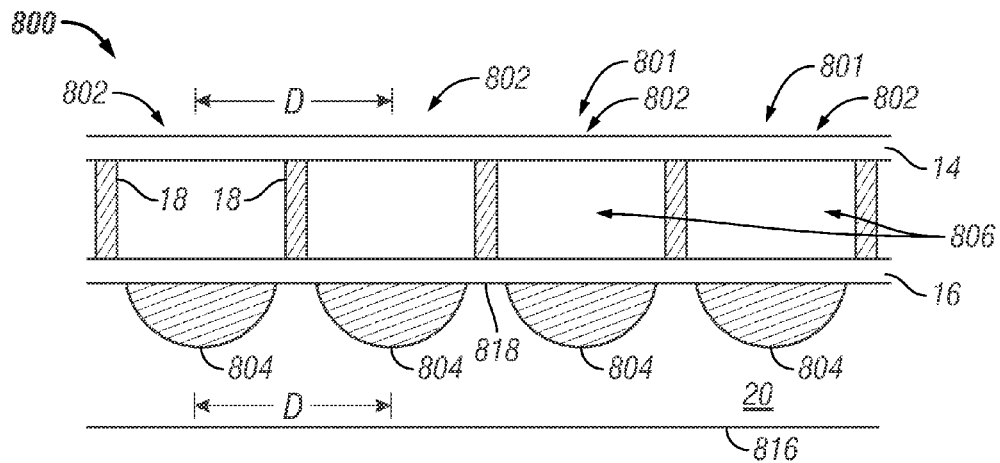
FIGS. 9A-9E show examples of cross sections of a display including an array of microlenses embedded in the substrate.

The details of the microlens array may vary widely. FIGS. 9A-9E show examples of cross sections that schematically illustrate different implementations of a display 800 that includes an array of microlenses 804. FIG. 9A shows an example that is generally similar to the example shown in FIG. 8. The pitch of the array of light modulators 802 (or the display elements 801) is D. In this implementation, each modulator 802 is disposed over a corresponding microlens 804, therefore, the pitch of the array of microlenses 804 is also D. In some implementations, the focal length of the microlenses 804 is selected to be comparable to the pitch D of the array of light modulators 802.

Figure 9B:
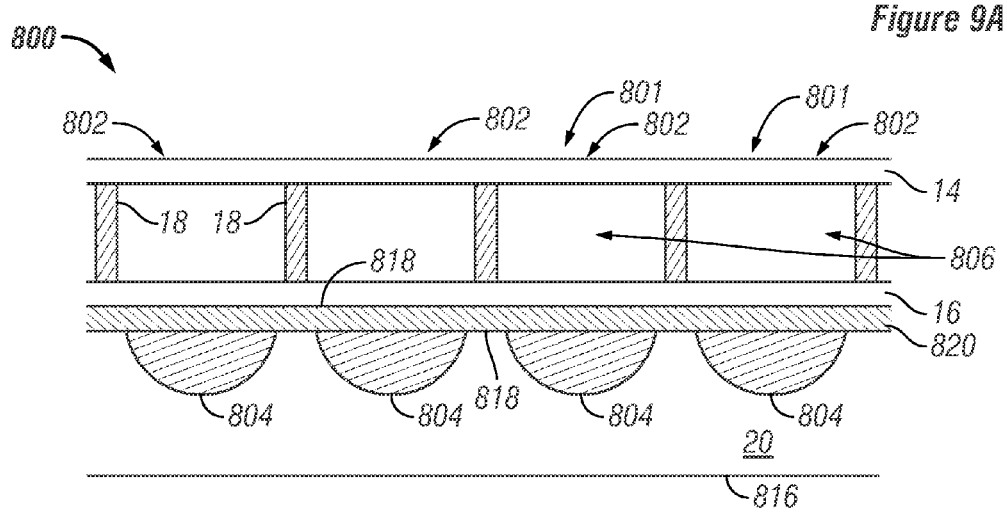
Figure 9C:
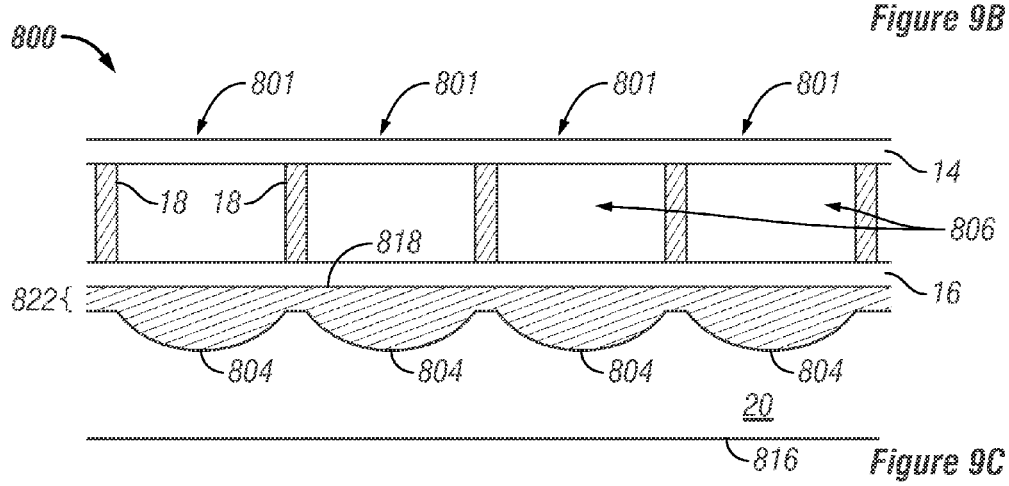

FIG. 9B shows an implementation of the display 800 in which a spacer layer 820 separates the microlenses 804 and the light modulators 802. The spacer layer 820 can permit the light refracted by the microlens 804 to move closer to the center of the light modulator 802 than in certain implementations not having a spacer layer 820. In some implementations, the thickness of the spacer layer 820 is in a range from about 0.01 µm to about 2 µm. Other thicknesses of the spacer layer 820 also can be used such as, e.g., less than about 5 µm, less than about 10 µm, etc. The spacer layer 820 may be a substantially transparent material (e.g., glass). In some implementations, the spacer layer 820 includes a material with a refractive index that is approximately equal to the refractive index of the substrate 20. The spacer layer 820 may include a filter material to filter light (e.g., a color filter) and/or a diffuser material to diffuse light. In some implementations, a plurality of spacer layers 820 can be used, for example, a substantially transparent spacer layer and a diffuser layer. Many variations of spacer layers 820 are possible. One or more spacer layers 820 can be used with any of the implementations described herein. FIG. 9C schematically illustrates an implementation in which the microlenses 804 are merged together and overlap near the first surface 818 of the substrate 20 and are not discrete elements spaced from each other. A portion 822 of the microlens array that is adjacent the first surface 818 of the substrate 20 functions substantially as a spacer layer separating the microlenses 804 and the light modulators 802.

Figure 9D:
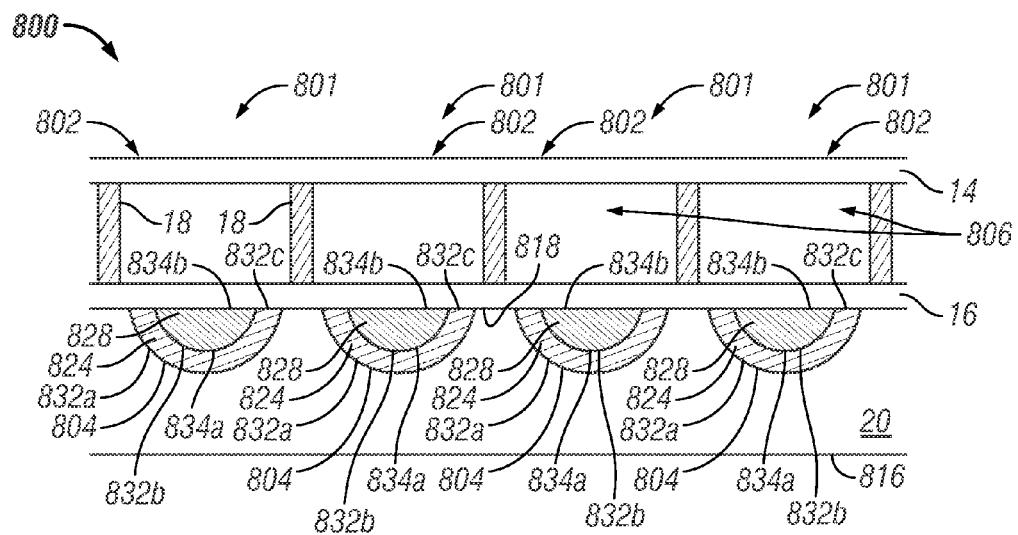

FIG. 9D schematically illustrates an implementation in which the microlenses 804 include compound lenses including a first lens 824 and a second lens 828. In this implementation, the first lens 824 is a meniscus lens having a convex outer surface 832*a*, a concave inner surface 832*b*, and a substantially planar surface 832*c*. The second lens 828 is a plano-convex lens having a convex outer surface 834*a* and a substantially planar surface 834*b*. In the illustrated implementation, the convex outer surface 834*a* of the second lens 828 is in contact with the concave inner surface 832*b* of the first lens 824. The first lens 824 can include a material having a refractive index that is different from the refractive index of the material including the second lens 828. One or both of the refractive indices of the first and second lenses 824, 828 can be different from the refractive index of the substrate 20. In some implementations, the refractive index of the second lens 828 is less than the refractive index of the first lens 824. One potential advantage of such implementations is that the second lens 828 tends to refract the light towards the direction normal to the reflective layer 14, which may improve the color response of the modulator 802. In other implementations, the compound lens can include more lenses than the two lenses 824, 828 schematically shown in FIG. 9D. Also, in other implementations, the lenses 824, 828 may be shaped and/or sized differently than schematically shown in FIG. 9D.

In various implementations, the second lens 828 is at least partially disposed or embedded in the first lens 824. The first lens 824 can include the substantially planar surface 832*c*, the second lens can include the substantially planar surface 834*b*, such that the substantially planar surface 832*c* and the substantially planar surface 834*b* are substantially coplanar with the first surface 818 of the substrate 20. In some implementations, at least a portion of the outer surface 832*a* surface and/or at least a portion of the outer surface 834*a* extend away from the first surface 818 of the substrate 20 toward the second surface 816 of the substrate. At least one of the surfaces 832*a*, 834*a* can be substantially a portion of a sphere.

Figure 9E:
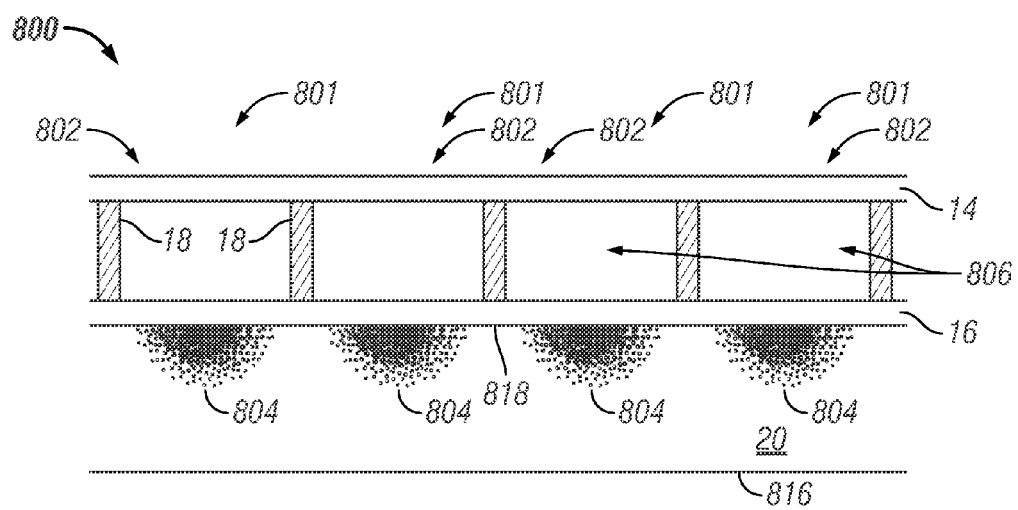

FIG. 9E schematically illustrates an implementation in which the microlenses 804 include graded-index (or gradient-index) lenses. In a graded-index lens, the refractive index varies between the center and surface of the lens (e.g., as schematically represented by the stippling shown in the microlenses 804). In some implementations of graded-index lenses, the refractive index is larger near the center of the lens than near the surface of the lens. The variation in refractive index (among other factors) can be selected to provide a desired degree of convergence or concentration of light refracted by the lens.

Figure 10:
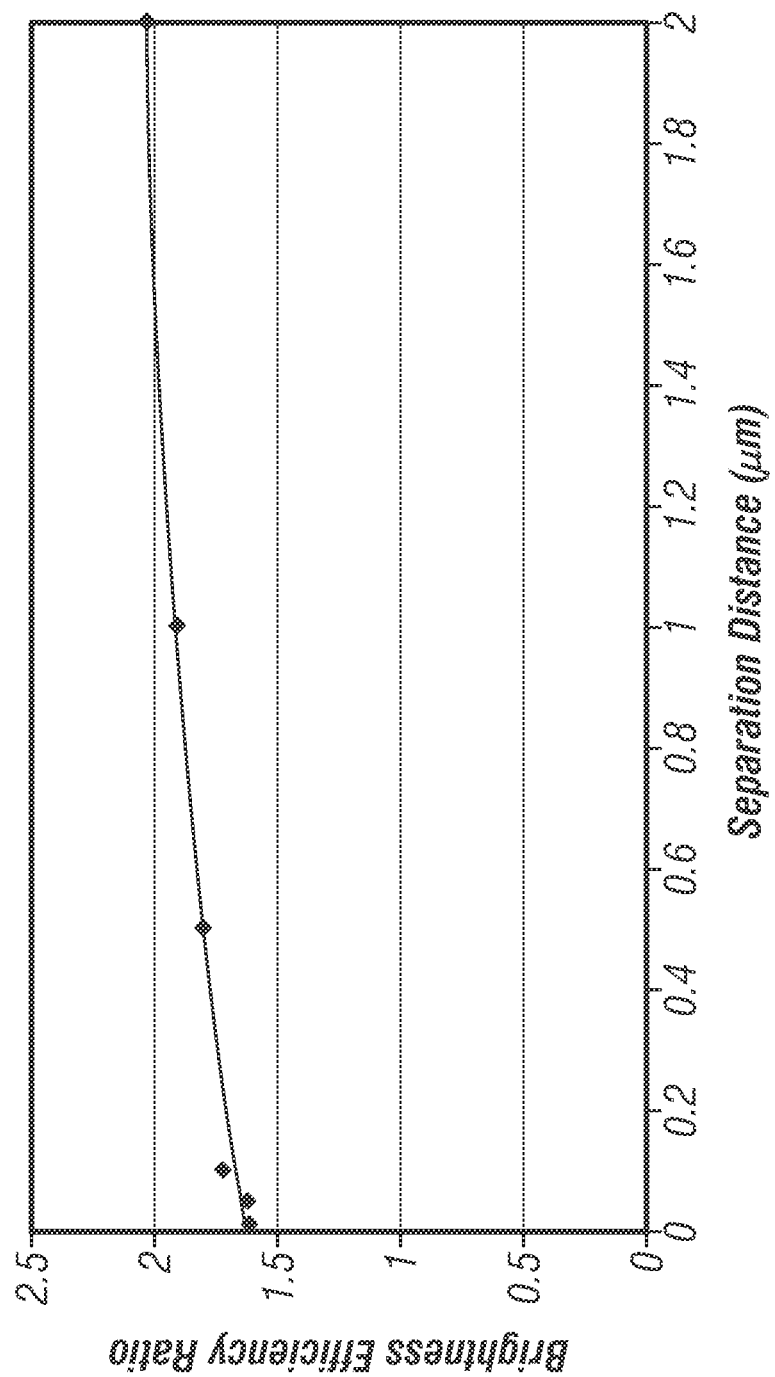
FIG. 10 shows a graph illustrating an example calculation of the increase in illumination near the center of a light modulator caused by convergence of light by a microlens embedded in the substrate.

FIG. 10 shows a graph illustrating an example calculation of the increase in illumination near the center of a light modulator caused by convergence of light by a microlens embedded in the substrate. The vertical axis is the brightness efficiency ratio, which is the ratio of peak light intensity (measured at the center of the modulator, directly above the center of the microlens, in the configurations shown in FIGS. 9A-9E) to the average light intensity that would occur in the absence of the microlens. The horizontal axis is the separation between the first surface 818 of the substrate 20 and the light modulator 802. The example calculations were performed using the Advanced Systems Analysis Program (ASAP®) available from Breault Research Organization in Tucson, Ariz. In the calculations, the microlens was assumed to be hemispherical with a radius of 15 µm and formed from SiN, with a refractive index of 2.05. The substrate was assumed to be glass, with a refractive index of 1.51. Light was incident normally on the substrate. FIG. 10 shows that in this example calculation the brightness efficiency ratio increases from about 1.6 (for a separation of 0.01 µm) to about 2 (for a separation of about 2 µm).

Figure 11A:
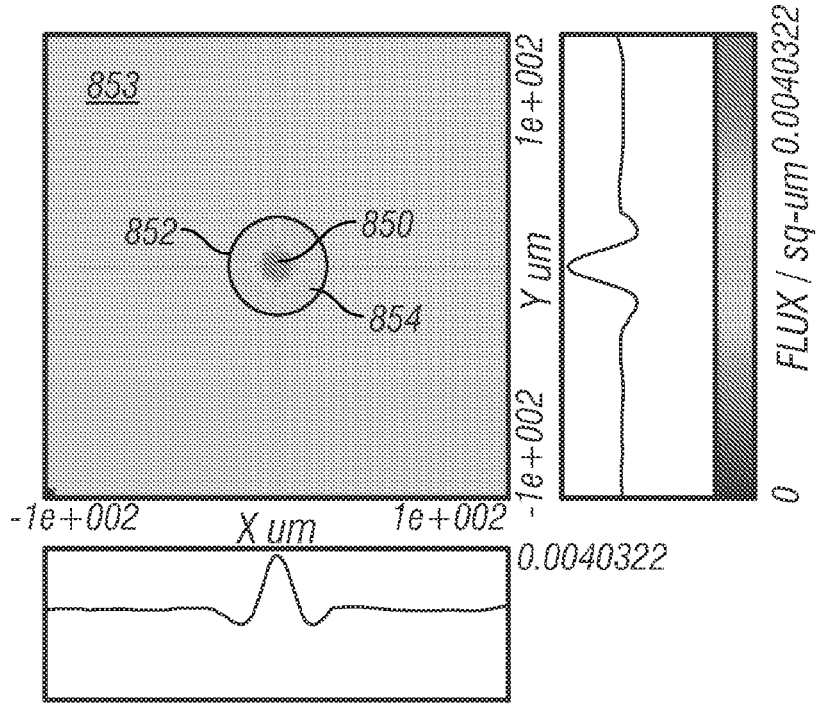
FIGS. 11A and 11B show illumination plots illustrating top views of example calculations of the distribution of light intensity for a light modulator having a microlens.
Figure 11B:
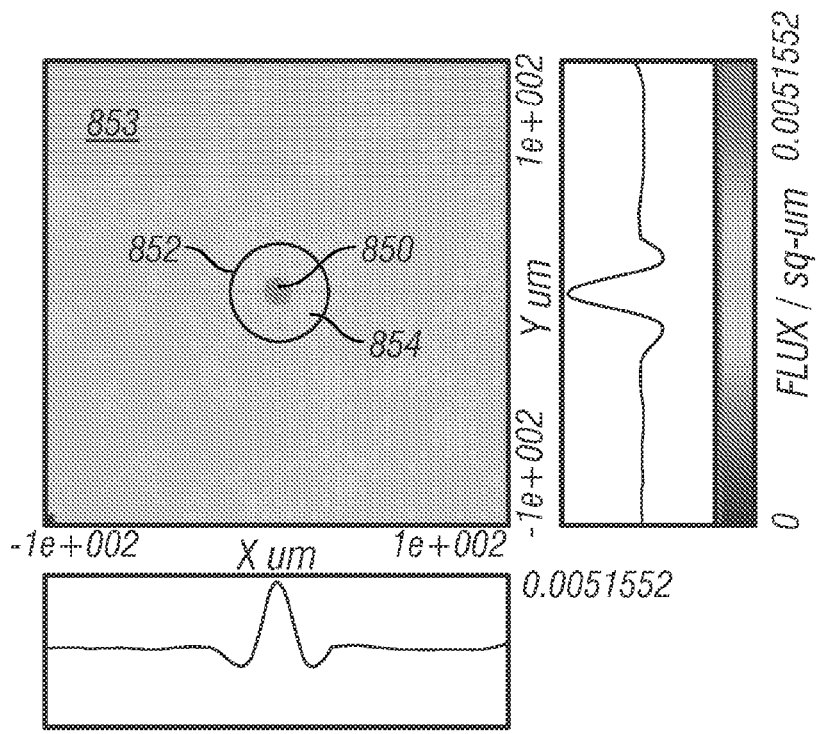

FIGS. 11A and 11B show illumination plots illustrating top views of example calculations of the distribution of light intensity for a light modulator having a microlens. In FIGS. 11A and 11B, the separation between the first surface 818 of the substrate 20 and the light modulator is 0.01 µm and 2.0 µm, respectively. In these illustrative top views, the light modulator extends between −100 µm and +100 µm in each of the directions in the X-Y plane of FIGS. 11A and 11B. The center of the microlens is positioned at the center of the illumination plots (e.g., at X=0, Y=0). The cross-section of the microlens is circular, shown by curve 852, and has a radius of 15 µm. The insets at the right and bottom of each graph show the intensity profile (e.g., flux/µm$^2$, in arbitrary units) along a vertical and horizontal cut, respectively, through the center of the illumination plot. The illumination plots and the insets show that the light intensity at a position 850 directly below the center of the microlens is increased compared to the intensity at positions 853 outside the lens 852. Due to the convergence of light toward the center 850, the illumination distribution has a circular "valley" 854 of lower intensity at a distance of about 15 µm from the center 850. The following table lists example intensities (in arbitrary units) and brightness efficiency ratios for different separations between the lower surface of the substrate and the light modulator.

| Separation (µm) | Peak Intensity (at center of microlens) | Intensity at valley (at 15 µm) | Intensity outside lens (at 70 µm) | Brightness Efficiency Ratio (Peak/Outside) |
|---|---|---|---|---|
| 0.01 | 0.0040322 | 0.0020379 | 0.0024876 | 1.62 |
| 0.05 | 0.0040528 | 0.0020328 | 0.0024876 | 1.63 |
| 0.1 | 0.0043846 | 0.0021276 | 0.0025376 | 1.73 |
| 0.5 | 0.0045942 | 0.0020834 | 0.0025376 | 1.81 |
| 1.0 | 0.004861 | 0.0020505 | 0.0025376 | 1.92 |
| 2.0 | 0.0051552 | 0.0020122 | 0.0025376 | 2.03 |

FIGS. 12A-12G show example cross sections that schematically illustrate a method of manufacturing a display including an array of display elements that include a microlens and a light modulator. In this implementation, the microlenses and light modulators are disposed in a periodic array having a pitch D. In implementations in which the array is two-dimensional, the pitch can be different in each dimension. In other implementations, the microlenses and/or the light modulators can be arranged non-periodically in one or in two dimensions. In some implementations, the pitch of the light modulators (in one or both dimensions of the array) can be substantially matched to the pitch of the microlenses (in one or both dimensions).

Figure 12A:
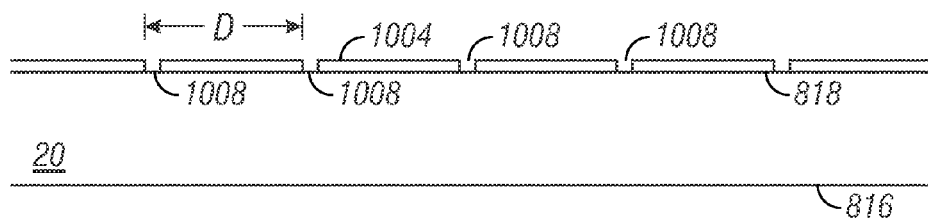
FIGS. 12A-12G show example cross sections that schematically illustrate a method of manufacturing a display including an array of display elements that include a microlens and a light modulator.
Figure 12B:
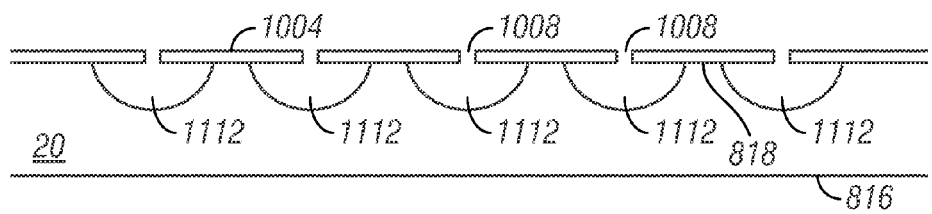
Figure 12C:
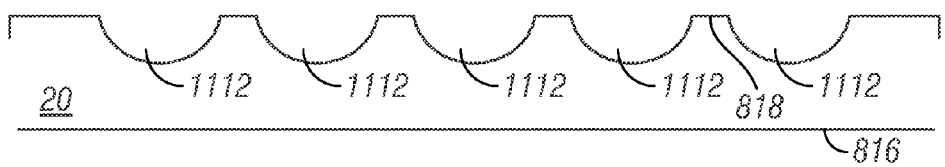

In FIG. 12A, the first surface 818 of the substrate 20 is masked with a mask 1004 that is patterned with openings 1008 spaced at the pitch D of the microlenses. Each opening 1008 can correspond to the center of a microlens. The openings 1008 can be formed, for example, via lithography. The mask 1004 is used to block the effects of an etchant, which can etch the substrate 20 through the openings 1008. The second surface 816 of the substrate 20 also can be masked (not shown in FIG. 12A) without openings to prevent etching of the second surface 816. In implementations in which a substantially symmetrical microlens is desired, an isotropic etchant such as, e.g., hydrofluoric acid (HF), can be used to etch a glass (SiO$_2$) substrate. With reference to FIG. 12B, the substrate 20 can be immersed in the etchant for a time sufficient to form cavities 1112. For an isotropic etch, the cavities 1112 may be substantially hemispherical. For display implementations in which the microlenses are discrete, separated elements (see, e.g., FIGS. 9A and 9B), the etch is stopped before the cavities 1112 merge together and at least partially overlap (e.g., the radius of the cavity is less than half of the pitch D). For display implementations in which the microlenses merge together (see, e.g., FIG. 9C), the etch is continued for a longer time so that the cavities 1112 overlap by a desired amount. Following the etch, the mask 1004 can be removed (see, e.g., FIG. 12C).

Figure 12D:
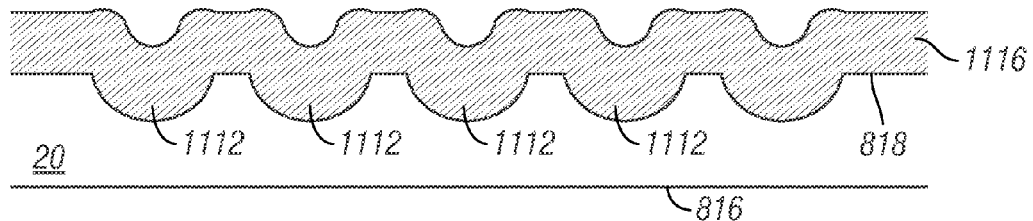

As schematically shown in FIG. 12D, a layer 1116 of dielectric material having a refractive index different from the refractive index of the substrate 20 can be formed on the first surface 818 of the substrate 20. For example, if the substrate 20 includes glass, the layer 1116 may include a dielectric material such as SiN, SiON, or polyimide. The dielectric layer 1116 can have a thickness that is sufficient to substantially fill the cavities 1112 with dielectric material. For example, in the implementation schematically shown in FIG. 12D, the dielectric layer 1116 fills the cavities 1112, and a portion of the dielectric layer 1116 extends below the surface 818. In some implementations, the dielectric layer 1116 at least partially fills the cavities 1112. It is advantageous if the layer 1116 includes a material that can be planarized. The dielectric layer 1116 may include a conformal layer, film, or coating. The layer 1116 may be deposited on the substrate 20 using thin-film techniques such as, for example, chemical vapor deposition (CVD). Since later processing steps (e.g., to form the light modulators) may use high temperatures, it is advantageous if the dielectric layer 1116 includes a material that can withstand the high temperature processing.

Figure 12E:
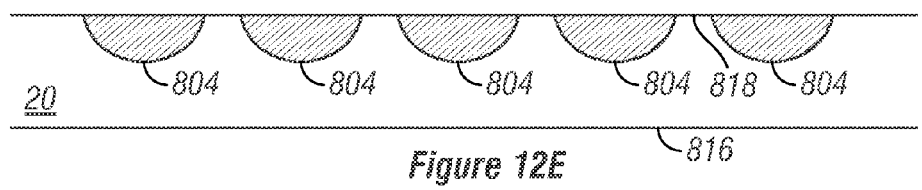

As schematically shown in FIG. 12E, the dielectric layer 1116 can be planarized down to the first surface 818 of the substrate 20. The microlenses 804 are thereby formed in the substrate 20, adjacent the first surface 818. In some implementations, chemical mechanical polishing (CMP) can be used to planarize the surface. For example, CMP can be used when the dielectric layer 1116 includes SiON. In other implementations, if the dielectric layer 1116 covering the surface 818 is sufficiently thick, a uniform etch back can be used for planarization. Other planarization techniques can be used such as, e.g., oxidation, chemical etching, sputtering, etc.

Figure 12F:
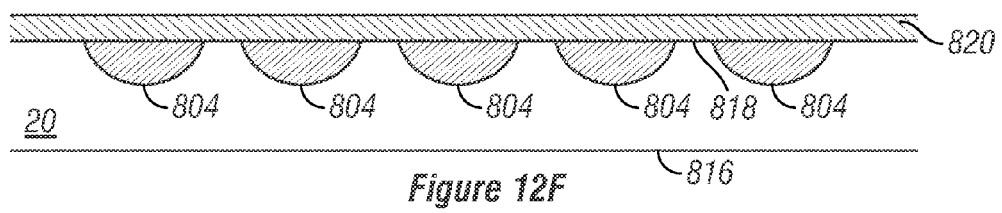

FIG. 12F schematically shows an optional step that can be used to provide a spacer layer 820 between the microlenses 840 and the light modulators 802. In this optional step, the spacer layer 820 is formed on the first surface 818 of the substrate 20. The spacer layer 820 can be deposited by CVD, for example. The spacer layer 820 can include a dielectric material such as, e.g., glass. Additional optional processing steps can be used to provide additional spacer layers, filter layers, diffuser layers, passivation layers, etc., if desired. As discussed with reference to the display 800 shown in FIG. 9C, in other implementations, a spacer layer 824 can be provided by increasing the etch time for forming the cavities 1112, as discussed above with reference to FIG. 12B. In some implementations, the etch time is sufficiently long for the microlenses 804 to at least partially overlap and form the layer 824, and a spacer layer 820 is also formed on the first surface 818 of the substrate 20.

Figure 12G:
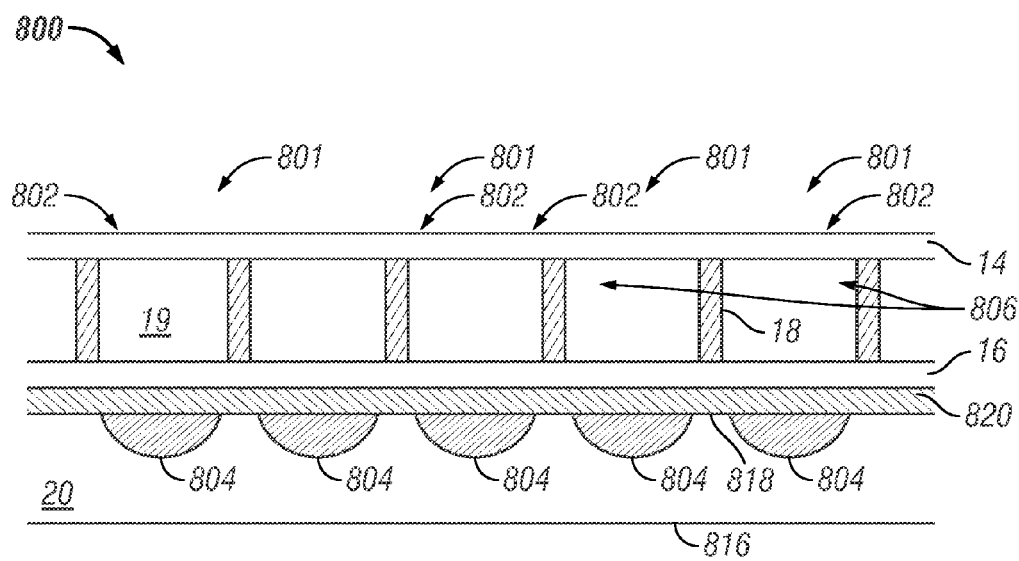

As schematically shown in FIG. 12G, an array of light modulators 802 can be formed over the first surface 818 of the substrate 20. In some implementations, the light modulators 802 include an optical stack 16 that includes a partial reflector, and a movable reflective layer 14, which define the optical cavity 806 therebetween. The light modulators 802 may be formed over the first surface 818 of the substrate 20 by, for example, forming the partial reflector over the first surface 818 of the substrate 20, forming a support structure (e.g., posts 18), forming a sacrificial layer over the partial reflector, and forming the movable reflector over the sacrificial layer. The sacrificial layer can be etched away to form the optical cavity 806. The array of light modulators 802 formed over the substrate 20 can have the same pitch D as the array of microlenses 804 embedded in the substrate 20. In some implementations, each light modulator 802 is aligned with a corresponding microlens 804. For example, the center of each light modulator 802 can be substantially aligned with the center of each microlens 804. In some implementations, the pattern of the microlenses 804 on the substrate 20 can be readily detectable during processing, and alignment of the light modulators 802 with corresponding microlenses 804 can be readily achieved.

In another implementation for forming the light modulators 802, layers of the optical stack 16 can be formed over the first surface 818 of the substrate 20 and patterned into parallel strips. The parallel strips may form row electrodes in the display 800. In some implementations, the optical stack 16 includes several layers, which can include, for example, one or more of an electrode layer, such as indium tin oxide (ITO), a partially reflective layer, such as chromium, and a transparent dielectric. In some implementations, one or more of the layers of the optical stack 16 are formed by deposition. The movable reflective layer 14 may be formed as a series of parallel strips of a deposited metal layer or layers (orthogonal to the row electrodes) to form columns deposited on top of posts 18 and an intervening sacrificial material deposited between the posts 18. When the sacrificial material is etched away, the movable reflective layer 14 is separated from the optical stack 16 by a gap 19, thereby providing the optical cavity 806 for modulating light. The light modulators 802 may be configured to be individually addressable (e.g., via the row and column electrodes) and actuated in response to an electrical signal. For example, the movable reflective layer 14 can be electrically actuated to move toward or away from the optical stack 16 to interferometrically modulate light in the optical cavity 806.

The light modulators 802 can be formed on the first surface 818 of the substrate 20. For example, the optical stack 16 can be formed on the first surface 818. In implementations including an optional spacer layer 820, the light modulators 802 can be formed on a lower surface of the spacer layer 820.

Figure 13A:
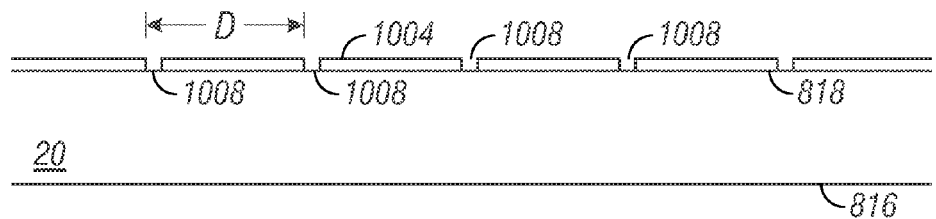
FIGS. 13A-13G show example cross sections that schematically illustrate a method of manufacturing a display including an array of display elements that include a compound microlens and a light modulator.
Figure 13B:
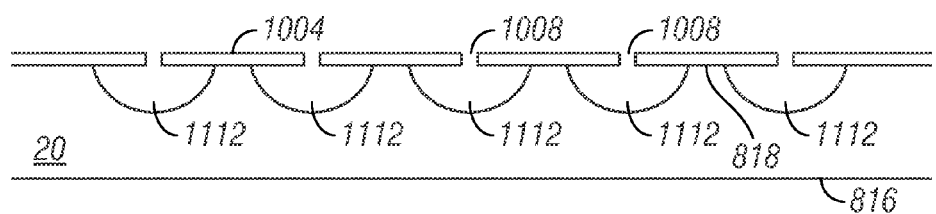
Figure 13C:
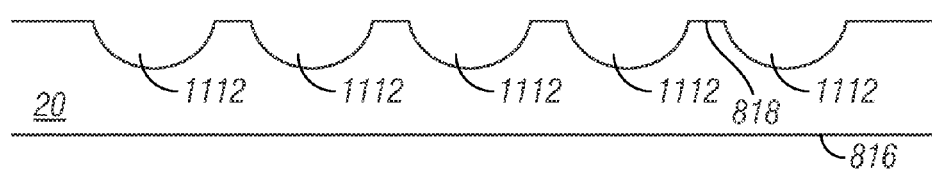
Figure 13D:
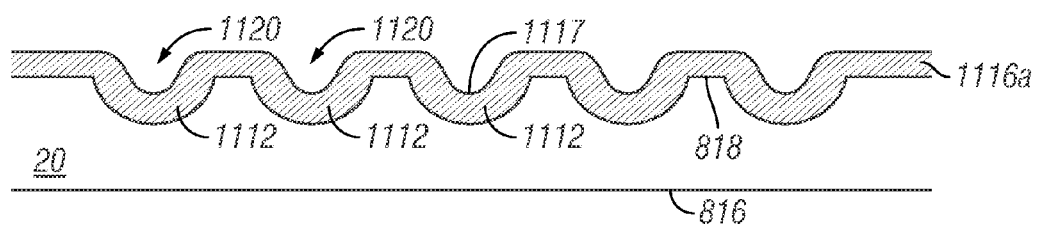

FIGS. 13A-13G show example cross sections that schematically illustrate a method of manufacturing a display 800 including an array of display elements that include a compound microlens and a light modulator. In this method, the processing shown in FIGS. 13A-13C can be generally similar to the processing shown in FIGS. 12A-12C. As schematically shown in FIG. 13D, a first layer 1116a of dielectric material having a refractive index different from the refractive index of the substrate 20 can be formed on the first surface 818 of the substrate 20. The first dielectric layer 1116a can include a conformal layer, film, or coating. The first dielectric layer 1116a may be deposited on the substrate 20 using thin-film techniques such as, e.g., CVD. The first dielectric layer 1116a can have a thickness that is sufficiently thick to at least partially fill the cavities 1112 formed in the substrate 20 and sufficiently thin to provide openings 1120 below a lower surface 1117 of the first dielectric layer 1116a. The first dielectric layer 1116a may be configured such that the openings 1120 extend above the first surface 818 of the substrate 20 to permit introduction of additional material to form the compound microlens as discussed below. In some implementations, the openings 1120 have a shape that is approximately a portion of a sphere (e.g., a hemisphere). Other shapes are possible such as, e.g., ovoids, ellipsoids, cylinders, prisms, polyhedra, etc.

Figure 13E:
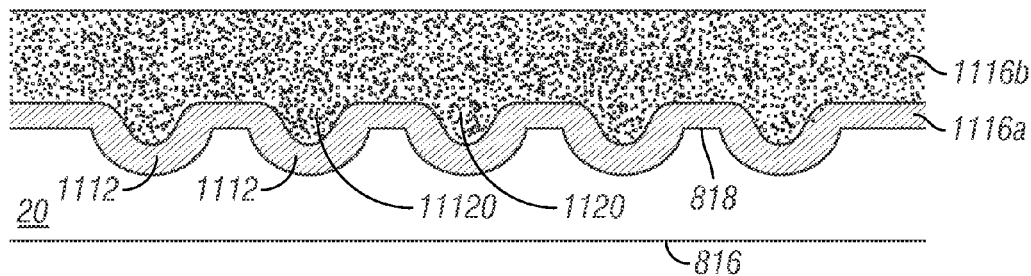

As schematically shown in FIG. 13E, a second dielectric layer 1116b is formed over the first dielectric layer 1116b. The second dielectric layer 1116b may include a conformal layer, film, or coating. In the implementation shown in FIG. 13E, the second dielectric layer 1116b substantially fills the openings 1120. The second dielectric layer 1116b can include material with a refractive index that is different from the refractive index of the first dielectric layer 1116a. In some implementations, the refractive index of the second layer 1116b is less than the refractive index of the first layer 1116a (e.g., as discussed above with reference to FIG. 9D). The layers 1116a, 1116b may include various dielectric materials such as, e.g., SiN, SiON, or polyimide. In some implementations, it might be advantageous if the layers 1116a, 1116b include materials that can be planarized and withstand higher processing temperatures typically used to form the light modulators.

Figure 13F:
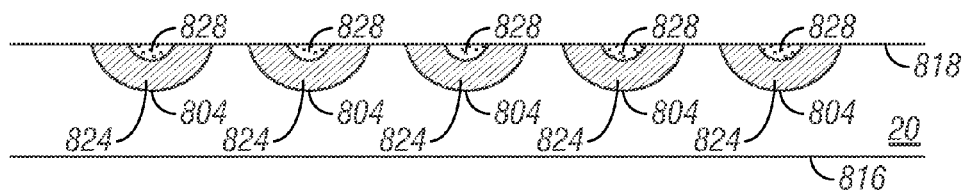

As schematically shown in FIG. 13F, the dielectric layers 1116a and 1116b are planarized down to the first surface 818 of the substrate 20. For example, CMP can be used for planarization in some implementations. Compound microlenses 804 are thereby formed in the substrate 20, adjacent the first surface 818. The compound microlens 804 shown in FIG. 13F includes a first lens 824 (including material from the first dielectric layer 1116a) and a second lens 828 (including material from the second dielectric layer 1116b). Among other factors (e.g., radius of the cavity 1120), the refractive indices and/or thicknesses of the dielectric layers 1116a, 1116b can be selected to provide desired optical characteristics of the microlens 804 (e.g., focal length). In other implementations, prior to planarization, additional dielectric layers can be formed over the first and second layers 1116a, 1116b in order to form a compound lens including more than two lenses.

Figure 13G:
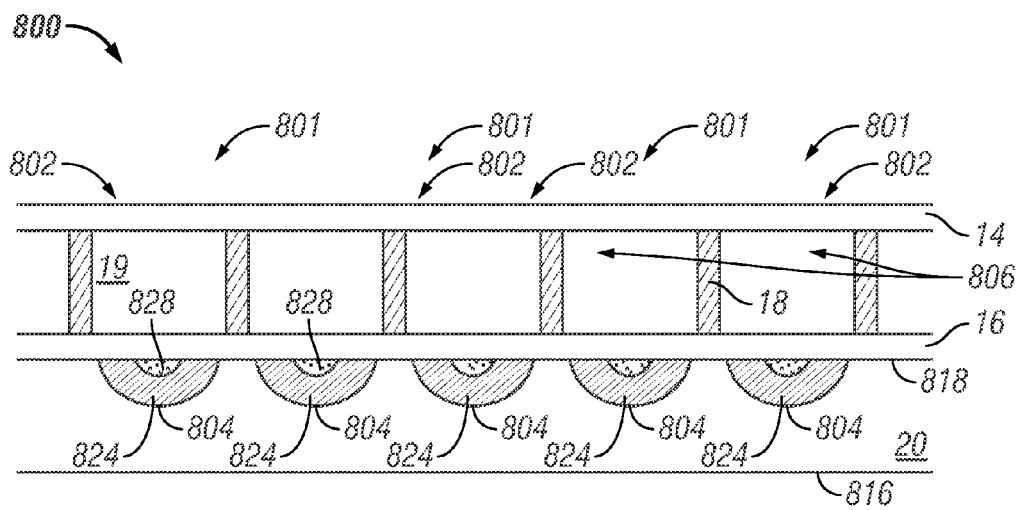

As schematically shown in FIG. 13G, an array of light modulators 802 is formed over the first surface 818 of the substrate 20. The light modulators 802 can be formed generally similarly as discussed above with reference to FIG. 12G. In some implementations, one or more spacer layers, filter layers, diffuser layers, passivation layers, etc. can be formed over the first surface 818 of the substrate 20 prior to forming the light modulators (see, e.g., FIG. 12F).

Figure 14A:
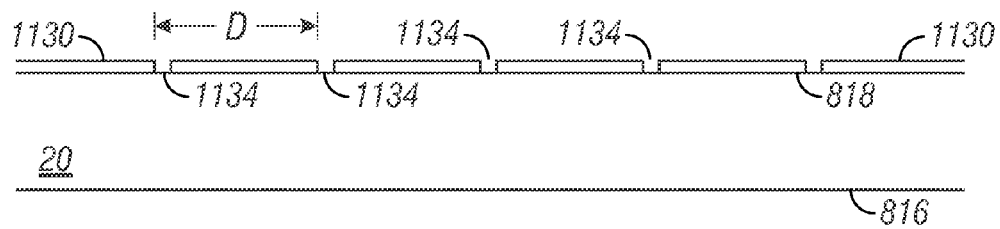
FIGS. 14A-14C show example cross sections that schematically illustrate a method of manufacturing a display including an array of display elements that include a graded-index (or gradient-index) microlens and a light modulator.
Figure 14B:
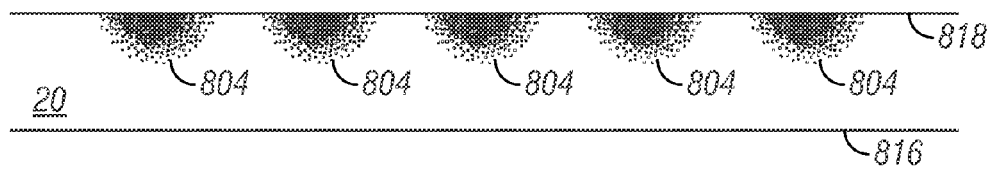
Figure 14C:
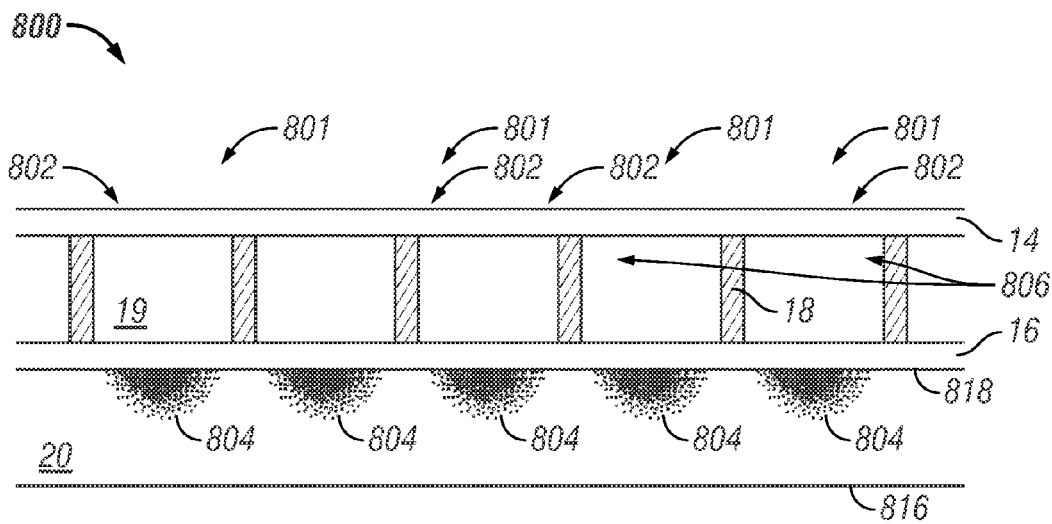

FIGS. 14A-14C show example cross sections that schematically illustrate a method of manufacturing a display including an array of display elements that include a graded-index (or gradient-index) microlens and a light modulator. As schematically shown in FIG. 14A, the first surface 818 of the substrate 20 is masked with a mask 1130 including material that is substantially impermeable to a dopant. The mask 1130 is patterned with openings 1134 that permit the dopant to diffuse into the substrate 20 through the openings 1134. In the implementation shown in FIG. 14A, the openings 1134 are spaced at the pitch D for the array of microlenses. In some implementations, the second surface 816 of the substrate is masked (without openings) to inhibit diffusion of the dopant into the substrate 20 through the second surface 816. The dopant can be selected to change an optical property of the substrate 20. For example, the dopant can be selected to change (e.g., increase or decrease) the refractive index of the substrate 20. In the case of a glass (e.g., $SiO_2$) substrate, an example of a dopant is boron, which increases the refractive index of the glass. Additional and/or different dopants can be used in other implementations. For example, phosphorous can be used as a dopant in some implementations.

The substrate 20 can be heated in the presence of the dopant to a temperature sufficient to diffuse the dopant through the openings 1134 and into the substrate 20. In some implementations, the substrate 20 is maintained at this temperature for a duration sufficient to allow a desired amount of dopant to diffuse in the substrate 20 and/or to provide a desired concentration gradient in the substrate 20. The diffusion process creates a gradient in concentration of the dopant such that the concentration is generally highest near the openings 1134 and decreases with distance away from the openings 1134. In the case of a dopant that changes refractive index of the substrate, the concentration gradient of the dopant provides a gradient in the refractive index of the substrate 20 near each opening 1134 (see, e.g., FIGS. 9E, 14B and 14C), thereby providing the graded-index microlenses 804. In various implementations, factors including the duration and/or temperature of the heating, the type of dopant, the size/shape of the openings 1134, and so forth can be selected to provide the desired optical characteristics of the graded-index microlenses 804 (e.g., focal length, size/shape of the microlens, etc.). If the mask 1130 (and/or a mask, if used, on the second surface 816) interferes with desired optical properties of the display 800, one (or both) masks can be removed (FIG. 14B shows an implementation in which the mask 1130 has been removed).

In some implementations, processing steps additional to those shown and described with reference to FIGS. 14A-14C may be used. For example, the first surface 818 of the substrate 20 may be planarized (e.g., via CMP) after formation of the microlenses 804. If stress from the formation of the graded-index microlenses adjacent the first surface 818 might tend to cause warping of the substrate 20, a similar, but unpatterned, dopant can be applied to the second surface 816 to compensate for the stress. One or more spacer layers, diffuser layers, filter layers, and/or passivation layers may be formed on the first surface 818 of the substrate 20.

As schematically illustrated in FIG. 14C, light modulators 802 can be formed over the first surface 818 of the substrate 20 using the methods described above with reference to FIGS. 12G and 13G.

If desired, an array of microlenses can be formed in the substrate such that the array includes single-element lenses (see, e.g., FIGS. 8 and 9A-9C), compound lenses (see, e.g., FIG. 9D), and/or graded-index lenses (see, e.g., FIG. 9D). For example, the substrate 20 can be masked, and a first plurality of single-element lenses can be formed using the method described with reference to FIGS. 12A-12E. The substrate 20 can be then masked and patterned again, and a second plurality of compound lenses formed using the method described with reference to FIGS. 13A-13F and/or a third plurality of graded-index lenses formed using the method described with reference to FIGS. 14A and 14B. Light modulators can be formed over the microlenses as described herein. Many variations are possible, and any of the methods and processes described herein can be used with each other and/or with other manufacturing processes.

Figure 15:
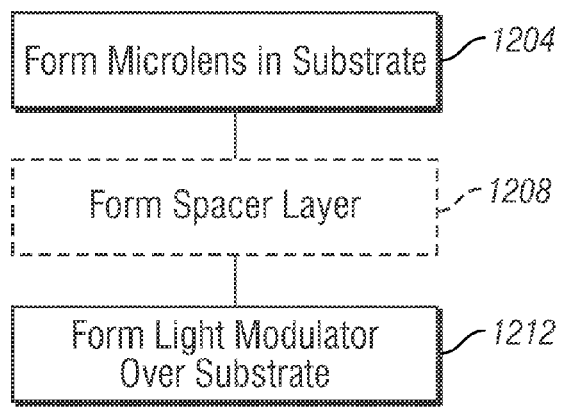
FIG. 15 shows an example of a flowchart illustrating a method of manufacturing a display element including a light modulator and a microlens.

FIG. 15 shows an example of a flowchart illustrating a method 1200 of manufacturing a display element 801 including a light modulator 802 and a microlens 804. In block 1204, a microlens 804 is formed in a substrate 20, adjacent a first surface 818 of the substrate 20. In various implementations, the microlens 804 may be formed as a simple lens (e.g., single element) as described with reference to FIGS. 12A-12E, a compound lens (e.g., two elements) as described with reference to FIGS. 13A-13F, and/or a graded-index lens as described with reference to FIGS. 14A-14B. In optional block 1208, one or more spacer layers 820, 824 are formed over the first surface 818 of the substrate 20. One or more of the spacer layers may include a filter layer, a diffuser layer, a passivation layer, etc. In block 1212, a light modulator 802 is formed over the first surface 818 of the substrate 20. Accordingly, in such implementations, the light modulator 802 is formed over the substrate 20 after the microlens 804 has been formed in the substrate 20. The light modulator 802 can be substantially aligned with the microlens 804. The light modulator 802 can include any of the implementations of light modulators described herein. For example, the light modulator 802 may include a reflective light modulator, an interferometric light modulator, etc. In some implementations, the light modulator 802 is formed on the first surface 818 of the substrate 20 or, if an optional spacer layer 820 is used, on a lower surface of the spacer layer. The display elements 801 can be formed in a one-dimensional or two-dimensional array (regular or irregular). The display elements 801 can be configured such that, in use, light incident on the display 800 (e.g., incident on the second surface 816) passes through the substrate 20, then through the microlenses 804, then through the spacer layer 820 (if used), and then enters the optical cavity 806 of the light modulators 802. A display 800 can include a plurality of the display elements 801, with each of the display elements 801 formed according to the method 1200.

Figure 16A:
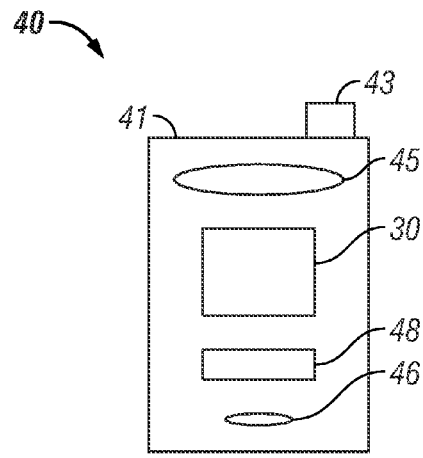
FIGS. 16A and 16B show examples of system block diagrams illustrating a display device that includes a plurality of interferometric modulators.
Figure 16B:
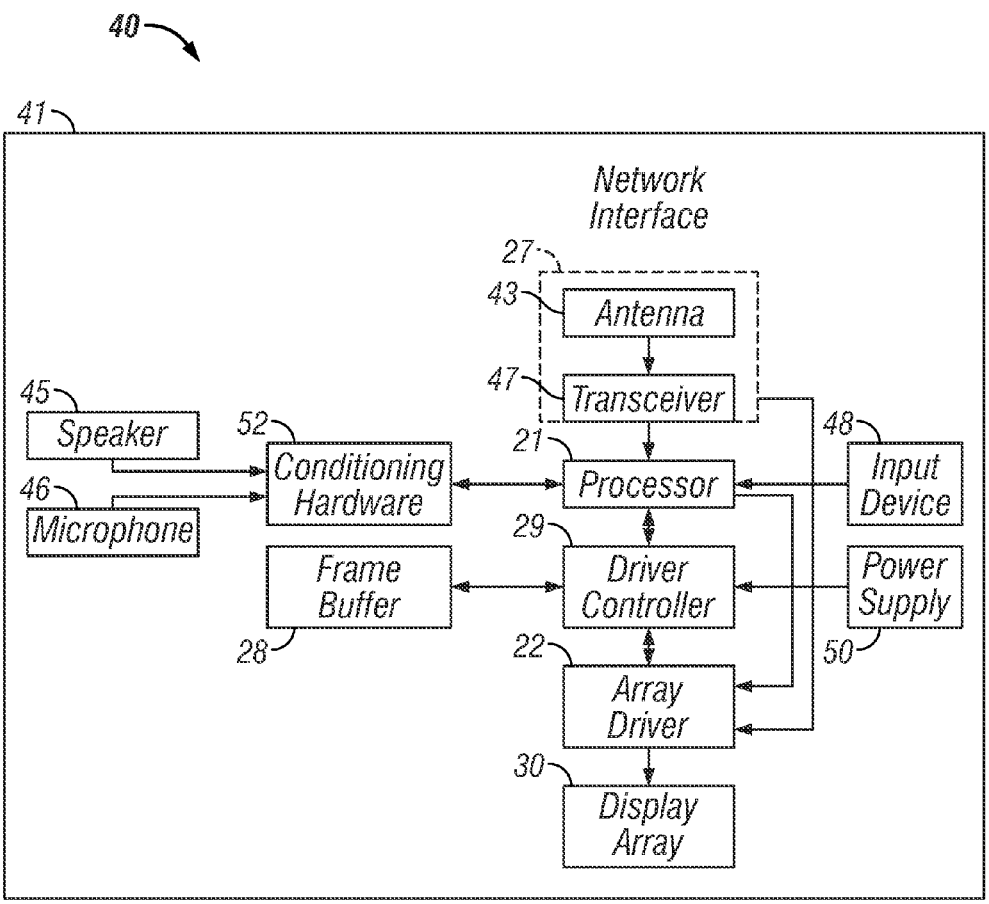

FIGS. 16A and 16B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 16B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

Variations in the process for forming the devices described herein (e.g., display, display elements, microlenses, and/or light modulators) are possible. For example, additional steps may be included, steps may be removed, steps may be combined, and/or the order of the steps may be altered. Similarly, the devices may be configured differently than shown and described herein. For example, additional components may be added, components may be removed, components may be combined, or the order and/or placement of the components may be altered. The components may have different sizes, shapes, and/or features incorporated therein. The components may also include additional and/or different materials. Still other variations in the arrangement of the component elements and the configuration as well as methods of use of and/or manufacturing the device are possible.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of manufacturing a display element, the method comprising:
   forming a microlens in a substrate having a first surface and a second surface, the first surface spaced from the second surface, the microlens disposed adjacent the first surface of the substrate, the microlens having a refractive index different from a refractive index of the substrate; and
   forming a light modulator over the first surface of the substrate, the light modulator disposed over the microlens, the light modulator comprising an optical cavity configured to be adjusted to interferometrically modulate light,
   wherein forming the light modulator includes forming an optical stack on the first surface of the substrate or on a spacer layer disposed between the first surface of the substrate and the light modulator, the optical stack being electrically conductive, partially transparent and partially reflective.

2. The method of claim 1, wherein forming the microlens comprises:
   forming a cavity in the first surface of the substrate; and
   forming a first dielectric layer over the first surface, the first dielectric layer comprising a refractive index that is different from a refractive index of the substrate, the first dielectric layer at least partially filling the cavity in the first surface of the substrate.

3. The method of claim 2, wherein the refractive index of the first dielectric layer is greater than the refractive index of the substrate.

4. The method of claim 2, wherein the substrate comprises glass, and the first dielectric layer comprises at least one of silicon nitride, silicon oxynitride, and polyimide.

5. The method of claim 2, wherein forming the cavity comprises:
   masking at least a portion of the first surface of the substrate with a mask, the mask comprising at least one opening; and
   etching the substrate with an etchant.

6. The method of claim 5, wherein the etchant comprises an isotropic etchant.

7. The method of claim 5, wherein the substrate comprises glass, and the etchant comprises hydrogen fluoride.

8. The method of claim 2, wherein forming the microlens further comprises planarizing the first dielectric layer.

9. The method of claim 8, wherein planarizing the first dielectric layer comprises chemical machine polishing a surface of the first dielectric layer.

10. The method of claim 8, wherein forming the microlens further comprises forming the spacer layer over the planarized first dielectric layer.

11. The method of claim 2, wherein forming the microlens further comprises forming a second dielectric layer over the first dielectric layer, the second dielectric layer comprising a refractive index that is different from the refractive index of the first dielectric layer.

12. The method of claim 11, further comprising planarizing at least the second dielectric layer.

13. The method of claim 1, wherein forming the microlens comprises:
   masking at least a portion of the first surface of the substrate with a mask, the mask comprising at least one opening; and
   diffusing a dopant into the substrate, the dopant selected to change a refractive index of the substrate.

14. The method of claim 13, wherein the dopant is selected to increase the refractive index of the substrate.

15. The method of claim 13, wherein the substrate comprises glass, and the dopant comprises boron.

16. The method of claim 13, wherein diffusing the dopant comprises heating the substrate.

17. The method of claim 1, wherein the optical stack includes a partial reflector, and forming the light modulator comprises:
   forming the partial reflector over the first surface of the substrate; and
   forming a movable reflector over the partial reflector, the movable reflector spaced from the partial reflector to provide the optical cavity, the movable reflector configured to move with respect to the partial reflector to interferometrically modulate light in the optical cavity.

18. A display comprising a plurality of display elements, each display element manufactured according to the method of claim 1.

19. The display of claim 18, further comprising:
   a processor that is configured to communicate with the display, the processor being configured to process image data; and
   a memory device that is configured to communicate with the processor.

20. The display of claim 19, further comprising a driver circuit configured to send at least one signal to the display.

21. The display of claim 20, further comprising a controller configured to send at least a portion of the image data to the driver circuit.

22. The display of claim 19, further comprising an image source module configured to send the image data to the processor.

23. The display of claim 22, wherein the image source module comprises at least one of a receiver, transceiver, and transmitter.

24. The display of claim 19, further comprising an input device configured to receive input data and to communicate the input data to the processor.

25. An electromechanical systems device, the device comprising:
   a substrate having a first side and a second side, the substrate having a substrate refractive index;
   a microlens disposed in the substrate, the microlens adjacent the first side of the substrate, the microlens comprising a first lens having a first refractive index and a second lens having a second refractive index, the second lens at least partially disposed in the first lens, the second refractive index different from the first refractive index, at least one of the first refractive index and the second refractive index different from the substrate refractive index; and
   a light modulator disposed over the first side of the substrate, the light modulator substantially aligned with the microlens, the light modulator comprising an optical cavity configured to be adjusted to interferometrically modulate light, the light modulator including an optical stack that is electrically conductive, partially transparent and partially reflective, the optical stack disposed on the first side of the substrate or on a spacer layer disposed between the first side of the substrate and the light modulator.

26. The device of claim 25, wherein the second refractive index is less than the first refractive index.

27. The device of claim 25, wherein the first lens, the second lens, or both the first lens and the second lens comprise at least one of silicon nitride, silicon oxynitride, and polyimide.

28. The device of claim 25, wherein the first lens has a first surface and a second surface, the first surface extending closer to the second side of the substrate than the second surface, and the second lens has a third surface and a fourth surface, the third surface extending closer to the second side of the substrate than the fourth surface, the third surface in contact with the second surface.

29. The device of claim 28, wherein the first surface, the second surface, and the third surface are substantially portions of spheres.

30. The device of claim 25, wherein the light modulator has a first transverse size, the microlens has a second transverse size, the second transverse size less than approximately the first transverse size.

31. The device of claim 30, wherein a focal length of the microlens is greater than approximately the first transverse size of the light modulator.

32. The device of claim 25, wherein the first lens comprises a substantially planar first surface, the second lens comprises a substantially planar second surface, the first surface and the second surface substantially coplanar with the first side of the substrate.

33. The device of claim 32, wherein the first lens comprises a curved third surface, the second lens comprises a curved fourth surface, at least a portion of the third surface and at least a portion of the fourth surface extending away from the first side of the substrate toward the second side of the substrate.

34. The device of claim 33, wherein at least one of the third surface and the fourth surface is substantially a portion of a sphere.

35. The device of claim 25, wherein the first lens comprises a meniscus lens and the second lens comprises a plano-convex lens.

36. The device of claim 25, wherein the optical stack includes a partial reflector disposed over the first side of the substrate, and the light modulator comprises:
the partial reflector; and
a movable reflector spaced from the partial reflector by a gap thereby providing the optical cavity.

37. The device of claim 25, wherein the optical stack is disposed on the spacer layer disposed between the first side of the substrate and the light modulator.

38. An electromechanical systems device, the device comprising:
means for refracting light, the refracting means disposed in a substrate having a first side and a second side and a substrate refractive index, the refracting means disposed adjacent the first side of the substrate, the refracting means comprising a first means for refracting light having a first refractive index and a second means for refracting light having a second refractive index, the second refracting means at least partially disposed in the first refracting means, the second refractive index different from the first refractive index, at least one of the first refractive index and the second refractive index different from the substrate refractive index; and
means for modulating light disposed over the first side of the substrate, the light modulating means substantially aligned with the refracting means, the light modulating means comprising an optical cavity configured to be adjusted to interferometrically modulate light, the light modulating means including an optical stack that is electrically conductive, partially transparent and partially reflective, the optical stack disposed on the first side of the substrate or on a separating means disposed between the first side of the substrate and the light modulating means.

39. The device of claim 38 wherein the second refractive index is less than the first refractive index.

40. The device of claim 38, wherein the means for refracting light comprises a microlens, the first refracting means comprises a first lens, and the second refracting means comprises a second lens.

41. The device of claim 40, wherein the first lens is a meniscus lens, and the second lens is a plano-convex lens.

42. The device of claim 38, wherein the light modulating means comprises an interferometric light modulator.

43. The device of claim 42, wherein the optical stack includes a partial reflector disposed over the first side of the substrate, and the interferometric light modulator comprises:
the partial reflector; and
a movable reflector spaced from the partial reflector by a gap thereby providing the optical cavity.

44. The device of claim 38, wherein the optical stack is disposed on the separating means disposed between the first side of the substrate and the light modulating means.

45. The device of claim 38, wherein the separating means comprises a spacer layer.

\* \* \* \* \*